US012640796B2

(12) United States Patent
Ly et al.

(10) Patent No.: US 12,640,796 B2
(45) Date of Patent: May 26, 2026

(54) CODEBOOK CONSIDERATION FOR DYNAMIC ANTENNA ADAPTATION

(71) Applicant: QUALCOMM INCORPORATED, San Diego, CA (US)

(72) Inventors: Hung Dinh Ly, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/686,376

(22) PCT Filed: Oct. 29, 2021

(86) PCT No.: PCT/CN2021/127394
§ 371 (c)(1),
(2) Date: Feb. 23, 2024

(87) PCT Pub. No.: WO2023/070518
PCT Pub. Date: May 4, 2023

(65) Prior Publication Data
US 2024/0413874 A1 Dec. 12, 2024

(51) Int. Cl.
| *H04B 7/0456* | (2017.01) |
| *H04B 7/06* | (2006.01) |
| *H04W 24/10* | (2009.01) |

(52) U.S. Cl.
CPC .......... *H04B 7/0636* (2013.01); *H04W 24/10* (2013.01)

(58) Field of Classification Search
CPC . H04L 5/0053; H04L 5/0023; H04L 27/2646; H04L 25/03955; H04L 5/0073;
(Continued)

(56) References Cited

U.S. PATENT DOCUMENTS

2008/0167061 A1* 7/2008 Mazzarese .......... H04L 27/2647
455/500
2008/0232501 A1* 9/2008 Khojastepour ...... H04B 7/0417
375/267
(Continued)

FOREIGN PATENT DOCUMENTS

| WO | WO-2018121239 A1 | 7/2018 |
| WO | WO-2021027895 A1 | 2/2021 |
| WO | WO-2021159330 A1 | 8/2021 |

OTHER PUBLICATIONS

International Search Report and Written Opinion—PCT/CN2021/127394—ISA/EPO—Jul. 20, 2022.
(Continued)

*Primary Examiner* — Eva Y Puente
(74) *Attorney, Agent, or Firm* — QUALCOMM Incorporated

(57) ABSTRACT

Methods, systems, and devices for wireless communications are described. A device may receive first control signaling indicating a first codebook configuration associated with a first channel state information reference signal (CSI-RS) antenna port configuration. The device may receive second control signaling indicating a second codebook configuration associated with a second CSI-RS antenna port configuration. The second CSI-RS antenna port configuration includes fewer antenna ports than the first CSI-RS antenna port configuration. The device may perform a channel state information (CSI) measurement based on the first codebook configuration and the second codebook configuration. The device may transmit a CSI report based on the CSI measurement.

26 Claims, 22 Drawing Sheets

(58) Field of Classification Search
CPC . H04L 5/0048; H04L 25/0204; H04L 1/0026; H04W 72/046; H04W 72/23; H04W 24/02; H04W 72/0453; H04W 28/0236; H04W 72/541; H04W 88/08; H04W 72/044; H04B 7/0456; H04B 7/0639; H04B 7/0478; H04B 7/0641; H04B 7/0617; H04B 7/0482; H04B 7/0465; H04B 7/0626
See application file for complete search history.

(56) References Cited

U.S. PATENT DOCUMENTS

| | | | |
|---|---|---|---|
| 2011/0085618 A1* | 4/2011 | Zhuang | H04W 72/21 375/296 |
| 2016/0156401 A1 | 6/2016 | Onggosanusi et al. | |
| 2017/0302353 A1 | 10/2017 | Rahman et al. | |
| 2018/0026687 A1 | 1/2018 | Rahman et al. | |
| 2018/0115357 A1 | 4/2018 | Park et al. | |
| 2018/0123664 A1 | 5/2018 | Li et al. | |
| 2018/0167117 A1 | 6/2018 | Liu et al. | |
| 2018/0375555 A1 | 12/2018 | Noh et al. | |
| 2020/0083943 A1* | 3/2020 | Rahman | H04B 7/063 |
| 2020/0186207 A1 | 6/2020 | Davydov et al. | |

OTHER PUBLICATIONS

Samsung: "Introduction of PMI Test Cases with Rel-16 eType II Codebook", 3GPP TSG-RAN4 Meeting #98-e, R4-2103833, Feb. 9, 2021 (Feb. 2, 2021) 13 Pages, The Whole Document.

NTT DOCOMO: "Codebook Enhancement for Non-precoded CSI-RS", 3GPP TSG RAN WG1 Meeting #85, R1-165201, Nanjing, China, May 23-27, 2016, 3rd Generation Partnership Project, Mobile Competence Centre, 650, Route Des Lucioles, F-06921 Sophia-Antipolis Cedex, France, vol. RAN WG1, No. Nanjing, China, May 23, 2016-May 27, 2016, May 14, 2016, pp. 1-3, XP051089813, the whole document.

NTT DOCOMO: "CSI Feedback Type I for NR MIMO", 3GPP TSG RAN WG1 Meeting #88, R1-1702842, Athens, Greece Feb. 13-17, 2017, 3rd Generation Partnership Project, Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 7, 2017, pp. 1-7, XP051221669, the whole document.

Supplementary European Search Report—EP219618766—Search Authority—Munich—Jun. 13, 2025.

* cited by examiner

| Antenna Ports 226 | Ng, N1, N2 227 |
|---|---|
| 8 | (2,2,1) |
| 16 | (2,4,1) |
| | (4,2,1) |
| 32 | (2,8,1) |
| | (4,4,1) |
| | (2,4,2) |
| | (4,2,2) |

Resource Element 235
CDM Group 240-a
CDM Group 240-b
CDM Group 240-c
CDM Group 240-d

Figures 4A, 4B:
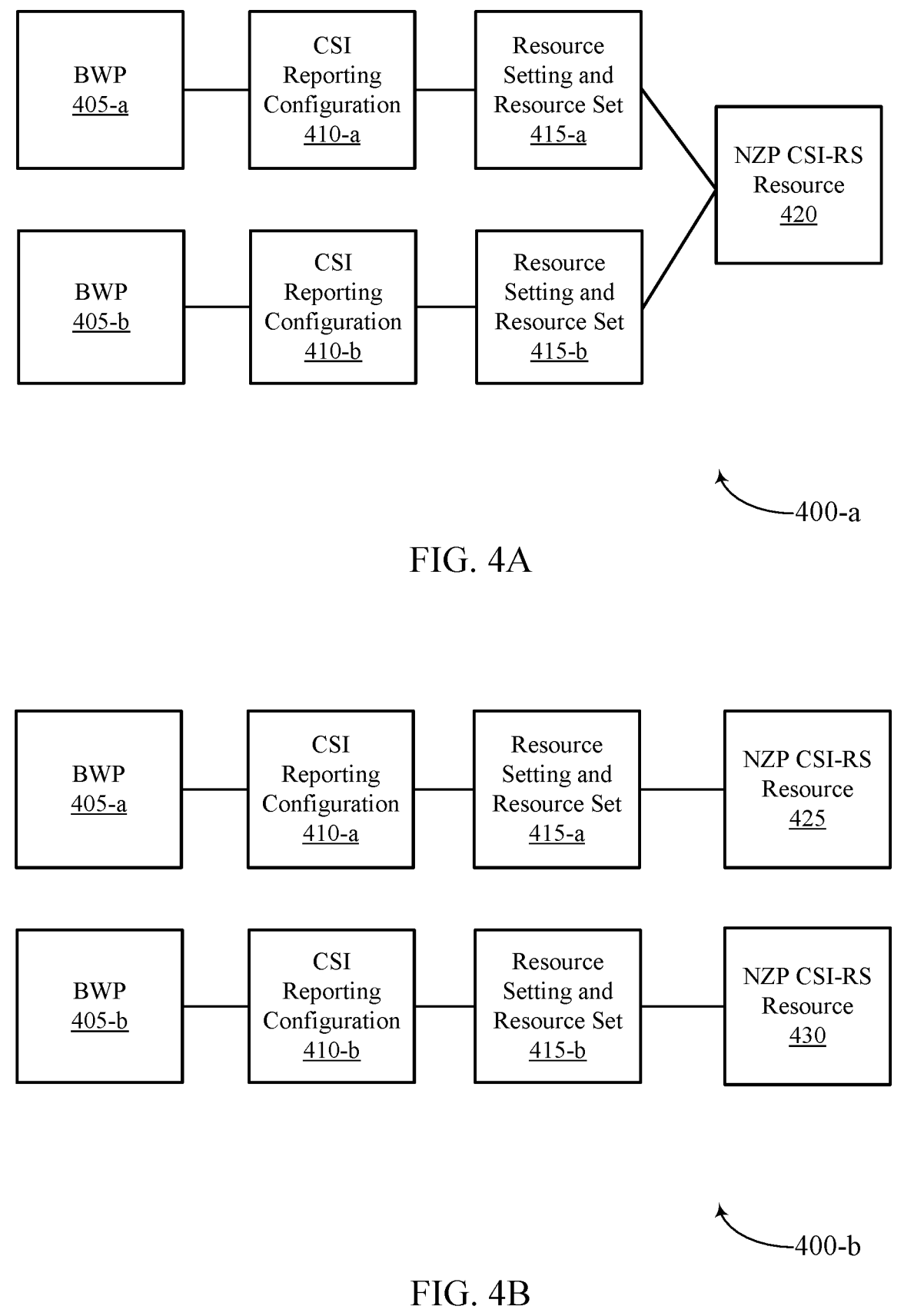

```
┌──────────┐   ┌──────────────┐   ┌──────────────┐
│          │   │     CSI      │   │   Resource   │
│   BWP    │───│  Reporting   │───│ Setting and  │──┐
│  405-a   │   │Configuration │   │ Resource Set │  │   ┌──────────────┐
│          │   │    410-a     │   │    415-a     │  │   │  NZP CSI-RS  │
└──────────┘   └──────────────┘   └──────────────┘  ├───│   Resource   │
                                                    │   │     420      │
┌──────────┐   ┌──────────────┐   ┌──────────────┐  │   │              │
│          │   │     CSI      │   │   Resource   │  │   └──────────────┘
│   BWP    │───│  Reporting   │───│ Setting and  │──┘
│  405-b   │   │Configuration │   │ Resource Set │
│          │   │    410-b     │   │    415-b     │
└──────────┘   └──────────────┘   └──────────────┘
```

```
┌──────────┐   ┌──────────────┐   ┌──────────────┐   ┌──────────────┐
│          │   │     CSI      │   │   Resource   │   │  NZP CSI-RS  │
│   BWP    │───│  Reporting   │───│ Setting and  │───│   Resource   │
│  405-a   │   │Configuration │   │ Resource Set │   │     425      │
│          │   │    410-a     │   │    415-a     │   │              │
└──────────┘   └──────────────┘   └──────────────┘   └──────────────┘

┌──────────┐   ┌──────────────┐   ┌──────────────┐   ┌──────────────┐
│          │   │     CSI      │   │   Resource   │   │  NZP CSI-RS  │
│   BWP    │───│  Reporting   │───│ Setting and  │───│   Resource   │
│  405-b   │   │Configuration │   │ Resource Set │   │     430      │
│          │   │    410-b     │   │    415-b     │   │              │
└──────────┘   └──────────────┘   └──────────────┘   └──────────────┘
```

| Number of CSI-RS antenna ports | (N1, N2) | (O1, O2) |
|---|---|---|
| 4 | (2,1) | (4,1) |
| 8 | (2,2) | (4,4) |
|  | (4,1) | (4,1) |
| 12 | (3,2) | (4,4) |
|  | (6,1) | (4,1) |
| 16 | (4,2) | (4,4) |
|  | (8,1) | (4,1) |
| 24 | (4,3) | (4,4) |
|  | (6,2) | (4,4) |
|  | (12,1) | (4,1) |
| 32 | (4,4) | (4,4) |
|  | (8,2) | (4,4) |
|  | (16,1) | (4,1) |

◼ Unable to Configure

◼ In CSI report Configuration

—500-a

| Number of CSI-RS antenna ports | (N1, N2) | (O1, O2) |
|---|---|---|
| 4 | (2,1) | (4,1) |
| 8 | (2,2) | (4,4) |
|  | (4,1) | (4,1) |
| 12 | (3,2) | (4,4) |
|  | (6,1) | (4,1) |
| 16 | (4,2) | (4,4) |
|  | (8,1) | (4,1) |
| 24 | (4,3) | (4,4) |
|  | (6,2) | (4,4) |
|  | (12,1) | (4,1) |
| 32 | (4,4) | (4,4) |
|  | (8,2) | (4,4) |
|  | (16,1) | (4,1) |

—500-b

| Number of CSI-RS antenna ports | (Ng, N1, N2) | (O1, O2) |
|---|---|---|
| 8 | (2,2,1) | (4,1) |
|   | (2,4,1) | (4,1) |
| 16 | (4,2,1) | (4,1) |
|    | (2,2,2) | (4,4) |
| 32 | (2,8,1) | (4,1) |
|    | (4,4,1) | (4,1) |
|    | (2,4,2) | (4,4) |
|    | (4,2,2) | (4,4) |

600-a

▓▓ Unable to Configure

▒▒ In CSI report Configuration

FIG. 6A

| Number of CSI-RS antenna ports | (Ng, N1, N2) | (O1, O2) |
|---|---|---|
| 8 | (2,2,1) | (4,1) |
|   | (2,4,1) | (4,1) |
| 16 | (4,2,1) | (4,1) |
|    | (2,2,2) | (4,4) |
| 32 | (2,8,1) | (4,1) |
|    | (4,4,1) | (4,1) |
|    | (2,4,2) | (4,4) |
|    | (4,2,2) | (4,4) |

| (N1, N2) in CSI report config | Reduced antenna config set (N1,N2) | Reduced antenna config index |
|---|---|---|
| (2,2) | (2,1) | 0 |
| (4,1) | (2,1) | 0 |
| (3,2) | (2,1), (2,2) | 0, 1 |
| (6,1) | (2,1), (4,1) | 0, 1 |
| (4,2) | (2,1), (2,2) | 0, 1 |
| (8,1) | (2,1), (4,1), (6,1) | 0, 1, 2 |
| (4,3) | (2,1), (2,2), (4,1), (3,2), (4,2) | 0, 1, 2, 3 |
| (6,2) | (2,1), (2,2), (4,1), (3,2), (6,1), (4,2) | 0, 1, 2, 3, 4 |
| (12,1) | (2,1), (4,1), (6,1), (8,1) | 0, 1, 2, 3 |
| (4,4) | (2,1), (2,2), (4,1), (3,2), (4,2), (4,3) | 0, 1, 2, 3, 4, 5 |
| (8,2) | (2,1), (2,2), (4,1), (3,2), (6,1), (4,2), (8,1), (6,2) | 0, 1, 2, 3, 4, 5, 6, 7 |
| (16,1) | (2,1), (4,1), (6,1), (8,1), (12,1) | 0, 1, 2, 3, 4 |

| (Ng, N1, N2) in CSI report config | Reduced antenna config set (Ng,N1,N2) | Reduced antenna config index |
|---|---|---|
| (2,4,1) | (1,2,1), (1,4,1), (2,2,1) | 0, 1, 2 |
| (4,2,1) | (1,2,1), (2,2,1) | 0, 1 |
| (2,2,2) | (1,2,1), (1,2,2), (2,2,1) | 0, 1, 2 |
| (2,8,1) | (1,2,1), (1,4,1), (1,6,1), (1,8,1), (2,2,1), (2,4,1) | 0, 1, 2, 3, 4, 5 |
| (4,4,1) | (1,2,1), (1,4,1), (2,2,1), (2,4,1), (4,2,1) | 0, 1, 2, 3, 4 |
| (2,4,2) | (1,2,1), (1,2,2), (1,4,1), (1,3,2), (1,4,2), (2,2,1), (2,4,1), (2,2,2) | 0, 1, 2, 3, 4, 5, 6, 7 |
| (4,2,2) | (1,2,1), (1,2,2), (2,2,1), (2,4,1), (4,2,1), (2,2,2) | 0, 1, 2, 3, 4, 5 |

| (N1, N2) in CSI report config | Reduced (N1,N2) config | Reduced (N1,N2) config index |
|---|---|---|
| (4,4) | (2,1), (2,2), (4,1), (3,2), (4,2), (4,3) | 0, 1, 2, 3, 4, 5, 6 |
| (8,2) | (2,1), (2,2), (4,1), (3,2), (6,1), (4,2), (8,1), (6,2) | 0, 1, 2, 3, 4, 5, 6, 7 |

Frequency

Time

☐ Resource Element 1005
▨ CDM Group 1010
▦ CDM Group 1015
▨ CDM Group 1020
▓ CDM Group 1025

1000

1210

1220

1215

1205

1200

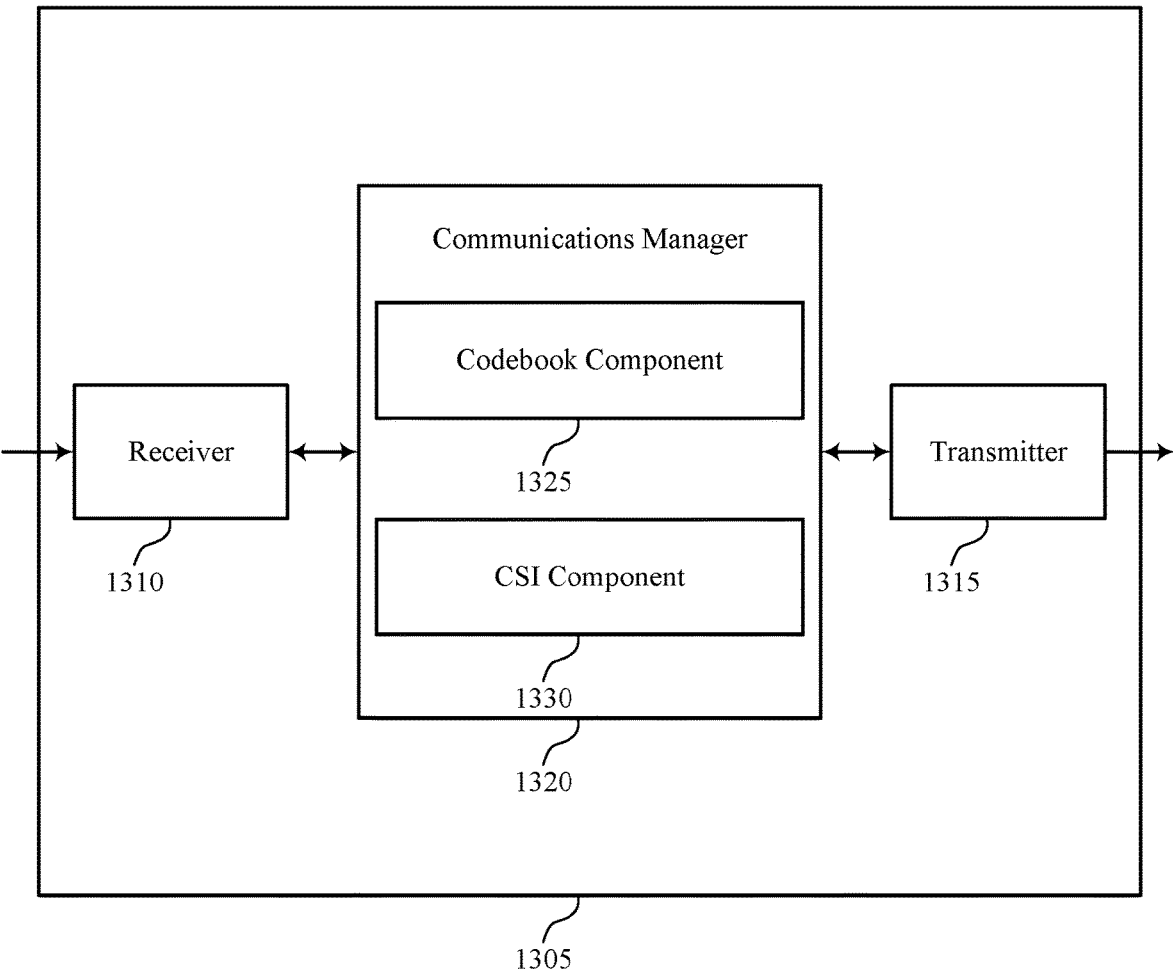
FIG. 13

1610

1620

1615

1605

1600

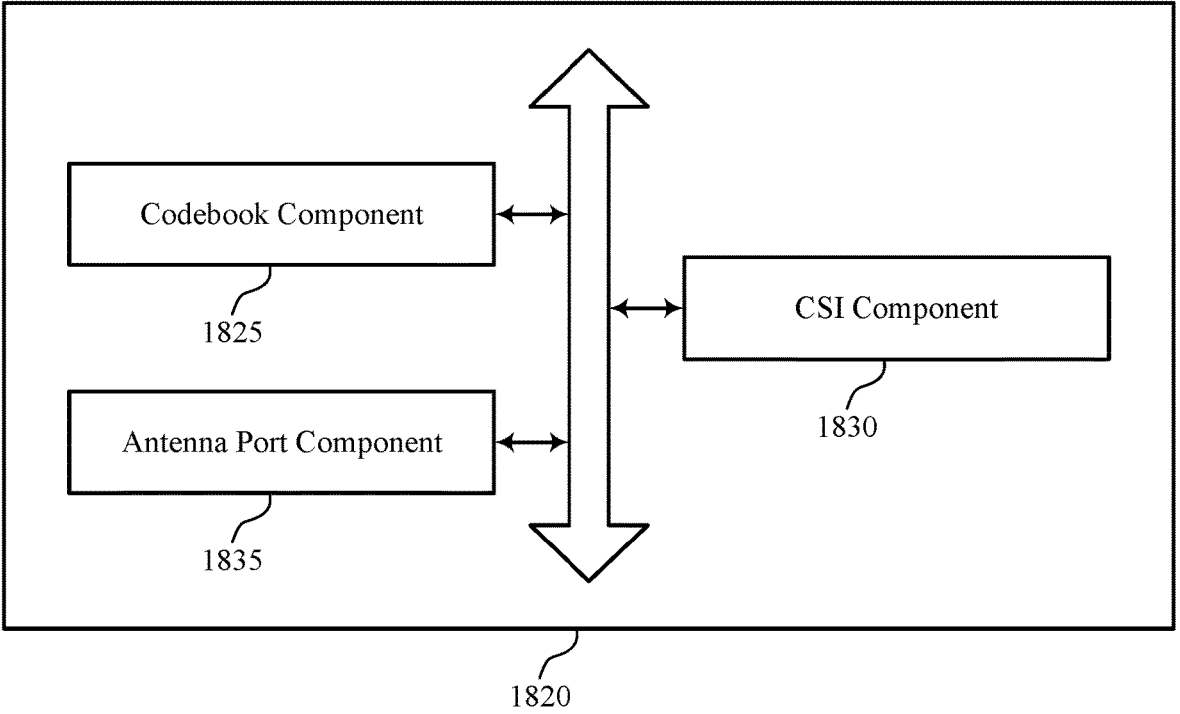
FIG. 18

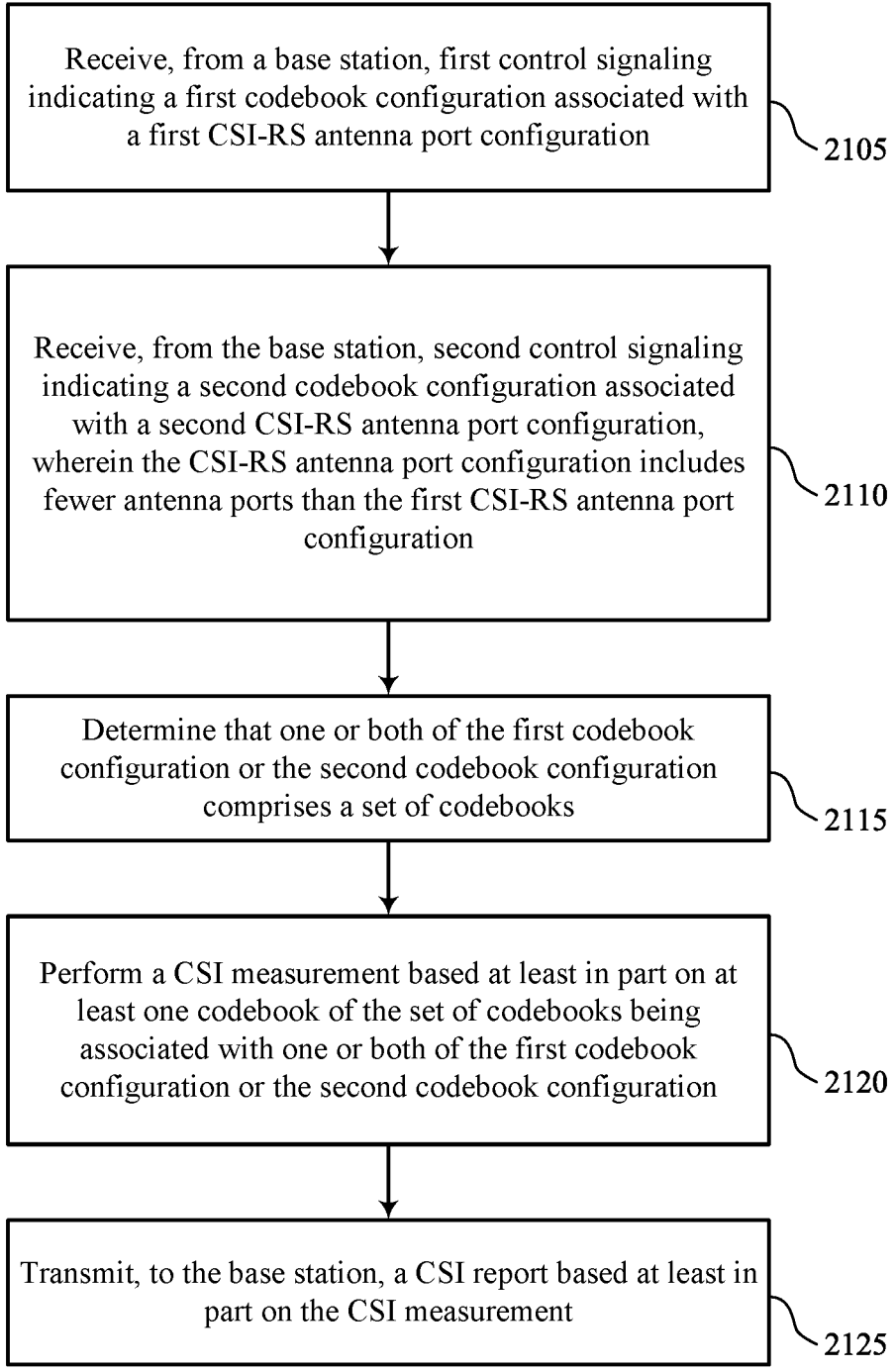

Receive, from a base station, first control signaling indicating a first codebook configuration associated with a first CSI-RS antenna port configuration

2105

Receive, from the base station, second control signaling indicating a second codebook configuration associated with a second CSI-RS antenna port configuration, wherein the CSI-RS antenna port configuration includes fewer antenna ports than the first CSI-RS antenna port configuration

2110

Determine that one or both of the first codebook configuration or the second codebook configuration comprises a set of codebooks

2115

Perform a CSI measurement based at least in part on at least one codebook of the set of codebooks being associated with one or both of the first codebook configuration or the second codebook configuration

2120

Transmit, to the base station, a CSI report based at least in part on the CSI measurement

CODEBOOK CONSIDERATION FOR DYNAMIC ANTENNA ADAPTATION

CROSS REFERENCE

The present Application is a 371 national stage filing of International PCT Application No. PCT/CN2021/127394 by Ly et al. entitled "CODEBOOK CONSIDERATION FOR DYNAMIC ANTENNA ADAPTATION," filed Oct. 29, 2021, which is assigned to the assignee hereof, and which is expressly incorporated by reference in its entirety herein.

FIELD OF TECHNOLOGY

The following relates to wireless communications, including codebook consideration for dynamic antenna adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to enabling a communication device (e.g., a UE) to support managing codebooks for wireless communication according to a change in a codebook configuration, which may correspond to a number of antenna panels (e.g., a single antenna panel or multiple antenna panels) associated with a number of antenna ports (e.g., channel state information reference signal (CSI-RS) antenna ports). In some examples, the communication device may support managing codebooks for wireless communication according to a reduced number of antenna ports relative to a number of antenna ports otherwise supported. For example, the communication device may receive, via control signaling, a first codebook configuration associated with a first CSI-RS antenna port configuration. The communication device may receive control signaling indicating a second codebook configuration associated with a second CSI-RS antenna port configuration. The second CSI-RS antenna port configuration may include fewer antenna ports than the first CSI-RS antenna port configuration. Examples of control signaling may include a radio resource control (RRC) message, a medium access control-control element (MAC-CE), and downlink control information (DCI), among other examples.

To support wireless communication according to the reduced number of antenna ports, the communication device may select a codebook (which may also be referred to as a fallback codebook) to use for CSI measurement and reporting based on the reduced number of antenna ports. In some cases, the communication device may declare (e.g., determine and flag or determine and indicate through signaling or transmission among other options) an error case if an antenna port configuration with a reduced number of antenna ports fails to satisfy one or more criteria. For example, the communication device may declare an error case when a reduced antenna port configuration is not fully within (e.g., contained in) an antenna port configuration that is configured as part of the codebook. By managing codebooks for wireless communication according to a change in an antenna configuration, the communication device may reduce the number of active antenna elements and associated circuit elements (e.g., power amplifiers), among other aspects, which may thereby provide for reduced power consumption at the communication device.

A method for wireless communication at a UE is described. The method may include receiving, from a base station, first control signaling indicating a first codebook configuration associated with a first CSI-RS antenna port configuration, receiving, from the base station, second control signaling indicating a second codebook configuration associated with a second CSI-RS antenna port configuration, where the second CSI-RS antenna port configuration includes fewer antenna ports than the first CSI-RS antenna port configuration, performing a CSI measurement based on the first codebook configuration and the second codebook configuration, and transmitting, to the base station, a CSI report based on the CSI measurement.

An apparatus for wireless communication at a UE is described. The apparatus may include a processor, memory coupled with the processor, and instructions stored in the memory. The instructions may be executable by the processor to cause the apparatus to receive, from a base station, first control signaling indicating a first codebook configuration associated with a first CSI-RS antenna port configuration, receive, from the base station, second control signaling indicating a second codebook configuration associated with a second CSI-RS antenna port configuration, where the second CSI-RS antenna port configuration includes fewer antenna ports than the first CSI-RS antenna port configuration, perform a CSI measurement based on the first codebook configuration and the second codebook configuration, and transmit, to the base station, a CSI report based on the CSI measurement.

Another apparatus for wireless communication at a UE is described. The apparatus may include means for receiving, from a base station, first control signaling indicating a first codebook configuration associated with a first CSI-RS antenna port configuration, means for receiving, from the base station, second control signaling indicating a second codebook configuration associated with a second CSI-RS antenna port configuration, where the second CSI-RS antenna port configuration includes fewer antenna ports than the first CSI-RS antenna port configuration, means for performing a CSI measurement based on the first codebook configuration and the second codebook configuration, and means for transmitting, to the base station, a CSI report based on the CSI measurement.

A non-transitory computer-readable medium storing code for wireless communication at a UE is described. The code may include instructions executable by a processor to receive, from a base station, first control signaling indicating a first codebook configuration associated with a first CSI-RS antenna port configuration, receive, from the base station, second control signaling indicating a second codebook configuration associated with a second CSI-RS antenna port configuration, where the second CSI-RS antenna port configuration includes fewer antenna ports than the first CSI-RS antenna port configuration, perform a CSI measurement based on the first codebook configuration and the second codebook configuration, and transmit, to the base station, a CSI report based on the CSI measurement.

Some examples of the method, apparatuses, and non-transitory computer-readable medium described herein may further include operations, features, means, or instructions for determining that one or both of the first codebook configuration or the second codebook configuration includes a set of codebooks and where performing the CSI measurement may be further based on at least one codebook of the set of codebooks being associated with one or both of the first codebook configuration or the second codebook configuration.

Some examples of the method, apparatuses, and non-transitory computer-readable medium described herein may further include operations, features, means, or instructions for receiving third control signaling indicating the at least one codebook of the set of codebooks being associated with one or both of the first codebook configuration or the second codebook configuration and where performing the CSI measurement may be further based on the third control signaling indicating the at least one codebook of the set of codebooks.

In some examples of the method, apparatuses, and non-transitory computer-readable medium described herein, receiving the third control signaling may include operations, features, means, or instructions for receiving one or more of an RRC message, DCI, or a MAC-CE, indicating the at least one codebook of the set of codebooks being associated with one or both of the first codebook configuration or the second codebook configuration.

In some examples of the method, apparatuses, and non-transitory computer-readable medium described herein, receiving the first control signaling may include operations, features, means, or instructions for receiving a CSI reporting configuration, the CSI reporting configuration indicating the first codebook configuration associated with the first CSI-RS antenna port configuration.

In some examples of the method, apparatuses, and non-transitory computer-readable medium described herein, receiving the first control signaling may include operations, features, means, or instructions for receiving one or more of an RRC message, DCI, or a MAC-CE, indicating the first codebook configuration associated with the first CSI-RS antenna port configuration.

In some examples of the method, apparatuses, and non-transitory computer-readable medium described herein, receiving the second control signaling may include operations, features, means, or instructions for receiving one or more of an RRC message, DCI, or a MAC-CE, indicating the second codebook configuration associated with the second CSI-RS antenna port configuration.

Some examples of the method, apparatuses, and non-transitory computer-readable medium described herein may further include operations, features, means, or instructions for receiving jointly the first control signaling indicating the first codebook configuration associated with the first CSI-RS antenna port configuration and the second control signaling indicating the second codebook configuration associated with the second CSI-RS antenna port configuration.

In some examples of the method, apparatuses, and non-transitory computer-readable medium described herein, receiving the second control signaling may include operations, features, means, or instructions for receiving a CSI-RS antenna port configuration index associated with the second CSI-RS antenna port configuration and where performing the CSI measurement may be further based on the CSI-RS antenna port configuration index.

Some examples of the method, apparatuses, and non-transitory computer-readable medium described herein may further include operations, features, means, or instructions for determining one or both of a discrete Fourier transform (DFT) beam restriction or a rank indicator restriction based on the second codebook configuration associated with the second CSI-RS antenna port configuration and where performing the CSI measurement may be further based on one or both of the DFT beam restriction or the rank indicator restriction.

In some examples of the method, apparatuses, and non-transitory computer-readable medium described herein, receiving the second control signaling may include operations, features, means, or instructions for receiving jointly a first indication of the second codebook configuration associated with the second CSI-RS antenna port configuration and a second indication of a set of CSI-RS resources for the CSI measurement and where performing the CSI measurement may be further based on the second codebook configuration and the set of CSI-RS resources.

In some examples of the method, apparatuses, and non-transitory computer-readable medium described herein, performing the CSI measurement may include operations, features, means, or instructions for performing the CSI measurement on a decreased number of antenna elements of a set of antenna elements and based on the second codebook configuration, the decreased number of antenna elements corresponding to the.

In some examples of the method, apparatuses, and non-transitory computer-readable medium described herein, performing the CSI measurement may include operations, features, means, or instructions for performing the CSI measurement on a decreased number of antenna panels of a set of antenna panels and based on the second codebook configuration.

In some examples of the method, apparatuses, and non-transitory computer-readable medium described herein, the second CSI-RS antenna port configuration includes a pre-configured CSI-RS antenna port configuration and may be entirely included within the first CSI-RS antenna port configuration.

In some examples of the method, apparatuses, and non-transitory computer-readable medium described herein, one or both of the first codebook configuration or the second codebook configuration corresponds to one or more antenna panels.

A method for wireless communication at a base station is described. The method may include transmitting, to a UE, first control signaling indicating a first codebook configuration associated with a first CSI-RS antenna port configuration, transmitting, to the UE, second control signaling indicating a second codebook configuration associated with a second CSI-RS antenna port configuration, where the second CSI-RS antenna port configuration includes fewer antenna ports than the first CSI-RS antenna port configuration, and receiving, from the UE, a CSI report based on the first codebook configuration and the second codebook configuration.

An apparatus for wireless communication at a base station is described. The apparatus may include a processor, memory coupled with the processor, and instructions stored in the memory. The instructions may be executable by the processor to cause the apparatus to transmit, to a UE, first control signaling indicating a first codebook configuration associated with a first CSI-RS antenna port configuration, transmit, to the UE, second control signaling indicating a second codebook configuration associated with a second CSI-RS antenna port configuration, where the second CSI-RS antenna port configuration includes fewer antenna ports than the first CSI-RS antenna port configuration, and receive, from the UE, a CSI report based on the first codebook configuration and the second codebook configuration.

Another apparatus for wireless communication at a base station is described. The apparatus may include means for transmitting, to a UE, first control signaling indicating a first codebook configuration associated with a first CSI-RS antenna port configuration, means for transmitting, to the UE, second control signaling indicating a second codebook configuration associated with a second CSI-RS antenna port configuration, where the second CSI-RS antenna port configuration includes fewer antenna ports than the first CSI-RS antenna port configuration, and means for receiving, from the UE, a CSI report based on the first codebook configuration and the second codebook configuration.

A non-transitory computer-readable medium storing code for wireless communication at a base station is described. The code may include instructions executable by a processor to transmit, to a UE, first control signaling indicating a first codebook configuration associated with a first CSI-RS antenna port configuration, transmit, to the UE, second control signaling indicating a second codebook configuration associated with a second CSI-RS antenna port configuration, where the second CSI-RS antenna port configuration includes fewer antenna ports than the first CSI-RS antenna port configuration, and receive, from the UE, a CSI report based on the first codebook configuration and the second codebook configuration.

In some examples of the method, apparatuses, and non-transitory computer-readable medium described herein, one or both of the first codebook configuration or the second codebook configuration includes a set of codebooks.

Some examples of the method, apparatuses, and non-transitory computer-readable medium described herein may further include operations, features, means, or instructions for transmitting third control signaling indicating at least one codebook of the set of codebooks being associated with one or both of the first codebook configuration or the second codebook configuration and where receiving the CSI report may be further based on the third control signaling.

In some examples of the method, apparatuses, and non-transitory computer-readable medium described herein, transmitting the third control signaling may include operations, features, means, or instructions for transmitting one or more of an RRC message, DCI, or a MAC-CE, indicating the at least one codebook of the set of codebooks being associated with one or both of the first codebook configuration or the second codebook configuration.

In some examples of the method, apparatuses, and non-transitory computer-readable medium described herein, transmitting the first control signaling may include operations, features, means, or instructions for transmitting a CSI reporting configuration, the CSI reporting configuration indicating the first codebook configuration associated with the first CSI-RS antenna port configuration.

In some examples of the method, apparatuses, and non-transitory computer-readable medium described herein, transmitting the first control signaling may include operations, features, means, or instructions for transmitting one or more of an RRC message, DCI, or a MAC-CE, indicating the first codebook configuration associated with the first CSI-RS antenna port configuration.

In some examples of the method, apparatuses, and non-transitory computer-readable medium described herein, transmitting the second control signaling may include operations, features, means, or instructions for transmitting one or more of an RRC message, DCI, or a MAC-CE, indicating the second codebook configuration associated with the second CSI-RS antenna port configuration.

Some examples of the method, apparatuses, and non-transitory computer-readable medium described herein may further include operations, features, means, or instructions for transmitting jointly the first control signaling indicating the first codebook configuration associated with the first CSI-RS antenna port configuration and the second control signaling indicating the second codebook configuration associated with the second CSI-RS antenna port configuration.

In some examples of the method, apparatuses, and non-transitory computer-readable medium described herein, transmitting the second control signaling may include operations, features, means, or instructions for transmitting a CSI-RS antenna port configuration index associated with the second CSI-RS antenna port configuration.

In some examples of the method, apparatuses, and non-transitory computer-readable medium described herein, transmitting the second control signaling may include operations, features, means, or instructions for transmitting jointly a first indication of the second codebook configuration associated with the second CSI-RS antenna port configuration and a second indication of a set of CSI-RS resources for the CSI measurement.

In some examples of the method, apparatuses, and non-transitory computer-readable medium described herein, one or both of a DFT beam restriction or a rank indicator restriction correspond to the second codebook configuration associated with the second CSI-RS antenna port configuration.

In some examples of the method, apparatuses, and non-transitory computer-readable medium described herein, the second CSI-RS antenna port configuration includes a pre-configured CSI-RS antenna port configuration and may be entirely included within the first CSI-RS antenna port configuration.

In some examples of the method, apparatuses, and non-transitory computer-readable medium described herein, one or both of the first codebook configuration or the second codebook configuration corresponds to one or more antenna panels.

BRIEF DESCRIPTION OF THE DRAWINGS

FIGS. 4A and 4B illustrate examples of CSI reporting configuration frameworks that support codebook consideration for dynamic antenna adaptation in accordance with aspects of the present disclosure.

FIGS. 6A and 6B illustrate examples of CSI reporting configuration frameworks that support codebook consideration for dynamic antenna adaptation in accordance with aspects of the present disclosure.

FIG. 7 illustrates an example of a single antenna panel configuration table that supports codebook consideration for dynamic antenna adaptation in accordance with aspects of the present disclosure.

FIG. 8 illustrates an example of a multi-panel antenna configuration table that supports codebook consideration for dynamic antenna adaptation in accordance with aspects of the present disclosure.

FIGS. 12 and 13 show block diagrams of devices that support codebook consideration for dynamic antenna adaptation in accordance with aspects of the present disclosure.

FIG. 18 shows a block diagram of a communications manager that supports codebook consideration for dynamic antenna adaptation in accordance with aspects of the present disclosure.

FIGS. 20 through 22 show flowcharts illustrating methods that support codebook consideration for dynamic antenna adaptation in accordance with aspects of the present disclosure.

DETAILED DESCRIPTION

Figure 1:
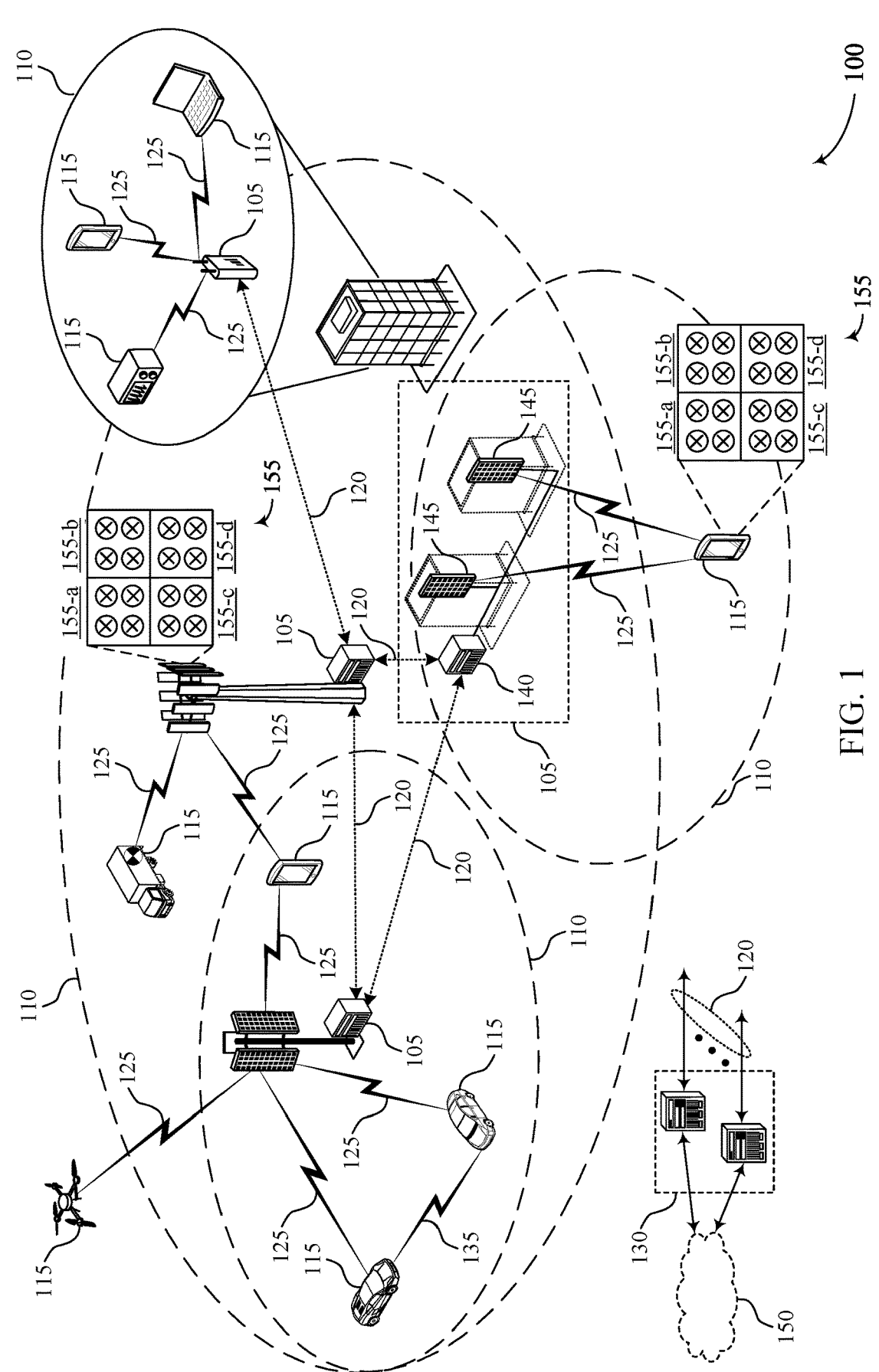
FIGS. 1 and 2 illustrate examples of wireless communications systems that support codebook consideration for dynamic antenna adaptation in accordance with aspects of the present disclosure.

A communication device may be configured with one or more antenna panels to support wireless communications with multiple other communication devices, for example, in a multiple-input multiple-output (MIMO) deployment. The communication device may support CSI measurement and CSI reporting on the one or more antenna panels, such as to provide low latency or high reliability wireless communications with other communication devices. For example, the communication device may perform CSI measurement and CSI reporting on resources configured for the communication device. The CSI measurement and CSI reporting may occur on CSI-RS resources, which may correspond to the one or more antenna panels. The communication device may receive a CSI reporting configuration, which may configure the communication device with one or more codebooks to use for wireless communication, such as CSI reporting. In some cases, the communication device may enable (e.g., power ON, move to a higher power state) or disable (e.g., power OFF, move to a lower power state) one or more antenna panels for energy efficiency. In some cases, when the communication device disables one or more of the antenna panels, appropriate codebook management for wireless communication may be desirable.

Various aspects of the present disclosure relate to enabling a communication device (e.g., a UE) to support managing codebooks for wireless communication according to a change in a codebook configuration, which may correspond to a number of antenna panels (e.g., a single antenna panel or multiple antenna panels) associated with a number of antenna ports (e.g., CSI-RS antenna ports). In some examples, the communication device may support managing codebooks for wireless communication according to a reduced number of antenna ports relative to a number of antenna ports otherwise supported. For example, the communication device may receive, via control signaling, a first codebook configuration associated with a first CSI-RS antenna port configuration. The communication device may receive control signaling indicating a second codebook configuration associated with a second CSI-RS antenna port configuration. The second CSI-RS antenna port configuration may include fewer antenna ports than the first CSI-RS antenna port configuration. In some cases, the second antenna port configuration may correspond to a subset of CSI-RS resources corresponding to the first antenna port configuration. Examples of control signaling may include a RRC message, a MAC-CE, and DCI, among other examples.

To support wireless communication according to the reduced number of antenna ports, the communication device may select a codebook (which may also be referred to as a fallback codebook) to use for CSI measurement and reporting based on the reduced number of antenna ports. In some cases, the communication device may declare (e.g., determine and flag or determine and indicate through signaling or transmission among other options) an error case if the reduced number of antenna ports fails to satisfy one or more criteria. An antenna configuration for a codebook configuration may correspond to a set of antenna elements ($N_1$, $N_2$) and a number of antenna panels (Ng). The communication device may declare (e.g., determine and flag or determine and indicate through signaling or transmission among other options) an error case in different circumstances.

In some examples, the communication device may declare (e.g., determine and flag or determine and indicate through signaling or transmission among other options) an error case, for example, if for a single antenna panel, a reduced antenna port configuration (e.g., an ($N_1$, $N_2$) port configuration) is not fully included within an antenna port configuration that is configured as part of a codebook configuration. In some other examples, the communication device may declare (e.g., determine and flag or determine and indicate through signaling or transmission among other options) an error case, for example, if for multiple antenna panels, a reduced antenna port configuration (e.g., an ($N_g$, $N_1$, $N_2$) port configuration) is not fully included within an antenna port configuration that is configured as part of a codebook configuration received in the CSI reporting configuration.

The communication device may adjust a number of antenna elements or a number of antenna panels, or both, to support the wireless communication according to the reduced number of antenna ports. By managing codebooks for wireless communication according to a change in an antenna configuration, the communication device may reduce the number of active antenna elements and their associated circuit elements (e.g., power amplifiers), which may thereby provide for reduced power consumption at the communication device. Additionally, by managing codebooks for wireless communication according to a change in an antenna configuration, the communication device may increase the reliability and decrease latency for wireless communication (e.g., CSI reporting).

Aspects of the disclosure are initially described in the context of wireless communications systems. Aspects of the disclosure are further illustrated by and described with reference to apparatus diagrams, system diagrams, and flowcharts that relate to codebook consideration for dynamic antenna adaptation.

FIG. 1 illustrates an example of a wireless communications system 100 that supports codebook consideration for dynamic antenna adaptation in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta$f) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna array's (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), or a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some network operators of the wireless communications system 100 may have increasing concerns for power consumption by communication devices (e.g., base stations 105, UEs 115, or the like) of the wireless communications system 100. In the wireless communications system 100, power consumption by communication devices (e.g., base stations 105, UEs 115, an adaptive antenna unit (AAU), a remote radio unit (RRU), a baseband unit (BBU), or the like) may be influenced by bandwidth allocation and number of antennas used for wireless communication or radio frequency spectrum band allocation for the wireless communications. In some cases, some network operators may have increased concerns for power consumed by communication devices due to environmental factors, such as carbon emissions. Additionally, some network operators may have increased concerns for power consumed by communication devices because of network energy efficiency concerns for the wireless communications system 100.

The wireless communications system 100 may support massive-MIMO (mMIMO) operations to increase throughput (e.g., transmissions) by utilizing multiple co-located antenna panels, which may be referred to a transmission-reception points (TRPs). For example, one or both of base stations 105 or UEs 115 in the wireless communications system 100 may be configured with a set of antenna panels 155 (e.g., co-located antenna panels) and may support mMIMO operations by utilizing the set of antenna panels 155. Each antenna panel 155 may be associated with a set of antenna ports, which may include one or more antenna ports, and be equipped with a number of power amplifiers (PAs) and other antenna circuit elements (e.g., other antenna subsystems), which might consume significant amount of power. In some cases, one or both of base stations 105 or UEs 115 may determine to disable (e.g., power OFF) the antenna panel 155 or one or more sub-antenna panels (e.g., a sub-antenna panel 155-a, a sub-antenna panel 155-b, a sub-antenna panel 155-c, or a sub-antenna panel 155-d, or a combination thereof) for energy efficiency. In some cases, one or both of base stations 105 or UEs 115 may fallback to operate in a half-duplex mode (e.g., in a frequency domain), or operate in a full-duplex mode with reduced wireless communications (e.g., low traffic in a cell) to reduce power consumption.

A UE 115 may support managing codebooks for wireless communication according to a change in an antenna configuration, which may correspond to a number of antenna panels (e.g., a single antenna panel or multiple antenna panels) associated with a number of antenna ports. In some examples, the UE 115 may support managing codebooks for wireless communication according to a reduced number of antenna ports. For example, the UE 115 may receive, via control signaling, an antenna port configuration of a set of antenna port configurations associated with the UE 115. The antenna port configuration may correspond to a codebook of a set of codebooks. The UE 115 may receive control signaling indicating a different antenna port configuration, which may include fewer antenna ports. Examples of control signaling may include an RRC message, a MAC-CE, and a DCI.

To support wireless communication according to the reduced number of antenna ports, the UE 115 may select a different codebook (also referred to as a fallback codebook) to use for the CSI measurement and CSI reporting based on the reduced number of antenna ports. The UE 115 may adjust a number of antenna elements or a number of antenna panels, or both, to support the wireless communication according to the reduced number of antenna ports. In some cases, the UE 115 may declare (e.g., determine and flag or determine and indicate through signaling or transmission among other options) an error case if the reduced antenna port configuration fails to satisfy a criterion. For example, the UE 115 may declare an error case when a reduced antenna port configuration is not fully included within an antenna port configuration that is configured as part of a codebook configuration.

An antenna configuration for a codebook configuration may correspond to a set of antenna elements $(N_1, N_2)$ and a number of antenna panels (Ng). The UE 115 may declare (e.g., determine and flag or determine and indicate through signaling or transmission among other options) an error case in different circumstances. In some cases, the UE 115 may declare (e.g., determine and flag or determine and indicate through signaling or transmission among other options) an error case, for example, if for a single antenna panel, an antenna port configuration (e.g., an $(N_1, N_2)$ port configuration) is not part of a reduced number of antenna port configuration (e.g., having a reduced number of antenna ports) that is configured as part of a codebook configuration (e.g., indicated to the UE 115). In some other cases, the UE 115-a may declare (e.g., determine and flag or determine and indicate through signaling or transmission among other options) an error case, for example, if for multiple antenna panels, a reduced antenna port configuration (e.g., an $(N_g, N_1, N_2)$ port configuration) is not part of an antenna port configuration that is configured as part of a codebook configuration received in a CSI reporting configuration.

By managing codebooks for wireless communication according to a change in an antenna configuration, the UE 115 may reduce the number of active antenna elements and their associated circuit elements (e.g., power amplifiers), which may thereby provide for reduced power consumption at the UE 115.

Figure 2:
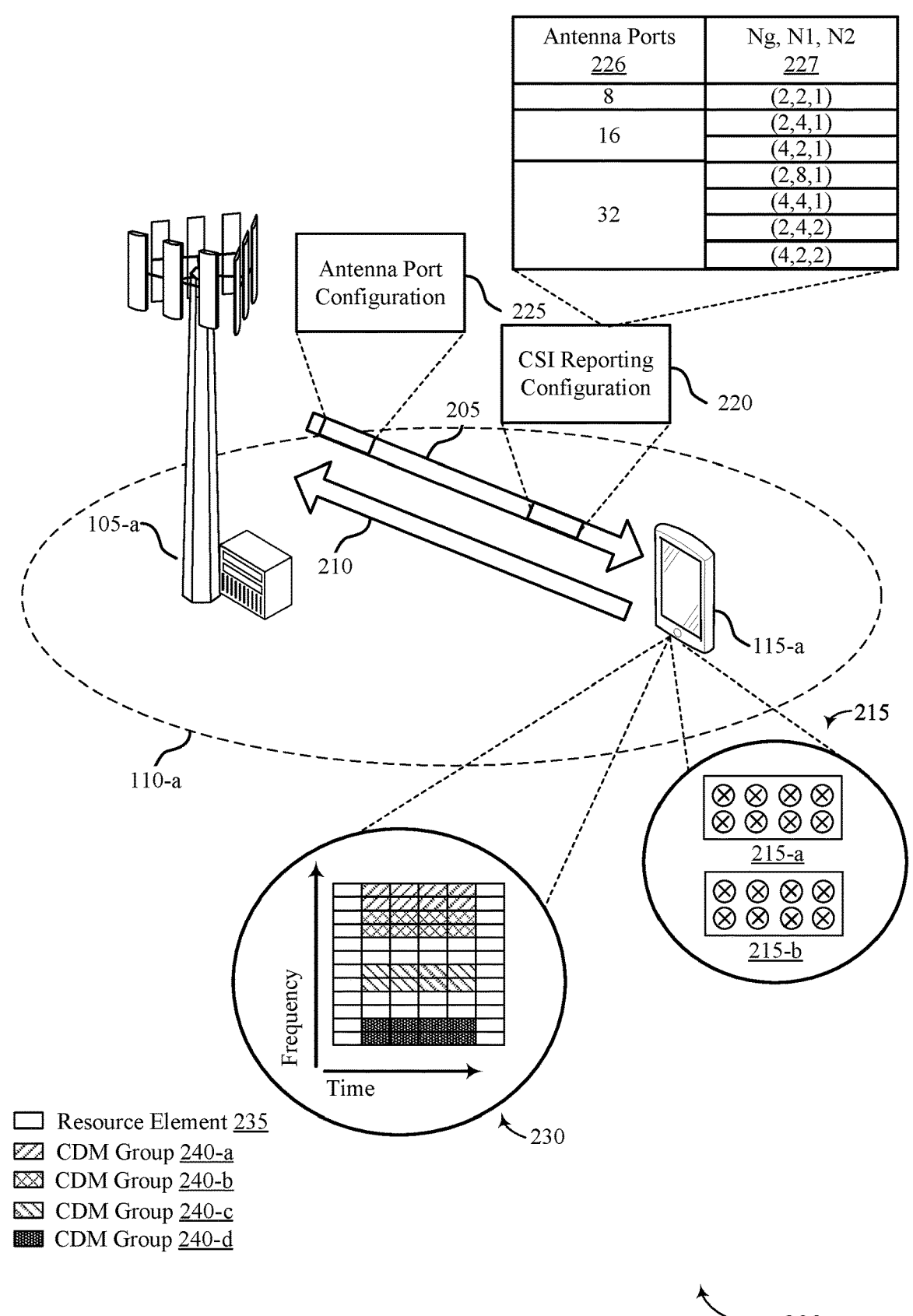

FIG. 2 illustrates an example of a wireless communications system 200 that supports codebook consideration for dynamic antenna adaptation in accordance with aspects of the present disclosure. The wireless communications system 200 may implement or be implemented by one or more aspects of the wireless communications system 100. For example, the wireless communications system 200 may include a base station 105-a and a UE 115-a, which may be examples of devices as described with reference to FIG. 1. The base station 105-a and the UE 115-a may communicate within a geographic coverage area 110-a over a communication link 205 and a communication link 210, which may be examples of geographic coverage areas 110 and communication links 125 as described with reference to FIG. 1. The wireless communications system 200 may support improvements to power consumption, higher data rates and, in some examples, may promote high reliability and low latency wireless communications, among other benefits.

The base station 105-a and the UE 115-a may support operations, such as mMIMO operations, using multiple co-located antenna panels. One or both of the base station 105-a or the UE 115-a may be equipped with multiple antenna panels, which may be used to employ techniques such as transmit diversity, receive diversity, MIMO communications, or beamforming. For example, the UE 115-a may be equipped with a set of antenna panels 215 including a first antenna panel 215-a and a second antenna panel 215-b. The antenna panels of one or both of the base station 105-a or the UE 115-a may be located within one or more antenna arrays, which may support MIMO operations or transmit or receive beamforming. The antenna panels may have an antenna array with a number of rows and columns of antenna ports that one or both of the base station 105-a or the UE 115-a may use to support wireless communications. For example, each of the first antenna panel 215-a and the second antenna panel 215-b may include one or more rows and columns of antenna ports.

In the example of FIG. 2, the UE 115-a may support CSI operations, such as CSI reporting to promote high reliability and low latency wireless communications with the base station 105-a. In some examples, the base station 105-a may transmit, and the UE 115-a may receive, a CSI reporting configuration 220. In some examples, the base station 105-a may transmit, and the UE 115-a may receive, the CSI reporting configuration 220 via an RRC message, or a MAC-CE, or a DCI, or any combination thereof. The CSI reporting may include one or more CSI parameters, which may include one or more of a channel quality indicator (CQI), a precoding matrix indicator (PMI), or a CSI-RS indicator (CRI). In some other examples, the one or more CSI parameters may include one or more of a layer indicator (LI) (e.g., a strongest layer indicator (SLI)), a rank indicator (RI), or a layer one reference signal received power (LI-RSRP) (e.g. for beam management).

The CSI reporting configuration 220 (e.g., a higher layer configuration) may be associated with a number of CSI reporting settings (e.g., N≥1), a number of resource settings (e.g., M≥1), or a number of CSI measurement links (e.g., L≥1). The CSI reporting configuration 220 may link to one or more resource settings associated with different measurement types as described in more detail in FIG. 3. For example, the one or more resource settings may include a non-zero power (NZP) CSI-RS resource for channel measurement (CMR), a CSI-RS resource for interference measurement (CSI-IM), an NZP CSI-RS for interference measurement, or any combination thereof. As such, the CSI reporting configuration 220 may grant resources for CSI measurement and CSI reporting by the UE 115-*a*. In some cases, a CSI reporting setting may be associated with one or more BWPs (e.g., a downlink BWP) and may include one or more radio frequency spectrum bands for CSI reporting (e.g., a CSI reporting band). BWP information associated with a BWP (e.g., a downlink BWP) may be configured per resource setting. In some cases, all linked resource settings of a CSI reporting setting may be associated with the same BWP. In some other cases, different resource settings of a CSI reporting setting may be associated with different BWPs.

In some cases, the CSI reporting configuration 220 may indicate one or more codebooks, which may be used to map transmissions (e.g., control information or data, or both) to one or more antenna ports associated with one or more antenna panels 215. One or both of the base station 105-*a* or the UE 115-*a* may support one or more different codebook types, which may include at least a first codebook type and a second codebook type. The first codebook type may be for single antenna panel or multiple antenna panels. The second codebook type may be for single antenna panel, antenna port selection, or enhanced antenna port selection, or any combination thereof.

In some examples, one or both of the base station 105-*a* or the UE 115-*a* may support an antenna configuration for each codebook type. Each codebook type may assume certain closely spaced antenna arrangements along linear or rectangular antenna panel arrays with two cross-polarized antenna elements at each antenna panel array element. An antenna configuration may indicate a number of antenna ports 226 (e.g., CSI-RS antenna ports) including 8, 16, or 32 antenna ports. A respective codebook associated with the antenna configuration may support 8, 16, or 32 antenna ports (e.g., for CSI-RS transmission). Additionally, the antenna configuration may support a set of antenna arrangements 227, where $N_1$ is the number of antenna elements in the horizontal direction, $N_2$ is the number of antenna elements in the vertical direction, and $N_g$ is the number of supported panels. The notation "horizontal" versus "vertical" represents typical arrangements, the actual orientation used is transparent to the UE 115-*a*.

In the example of FIG. 2, the number of antenna elements $N_1$ may be equal to 4 (e.g., $N_1=4$), the number of antenna elements $N_2$ may be equal to 2 (e.g., $N_2=2$), and the number of antenna panels $N_g$ may be equal 2 (e.g., $N_g=2$). As such, the UE 115-*a* may support 32 antenna ports, for example, for CSI-RS transmissions. In some cases, the UE 115-*a* may enable (e.g., power ON) or disable (e.g., power OFF) one or more antenna panels 215 for energy efficiency. Additionally, the UE 115-*a* may support wireless communication via one or more antenna ports associated with the one or more antenna panels 215. For example, the UE 115-*a* may perform CSI measurement and CSI reporting via one or more antenna ports associated with the one or more antenna panels 215. In some cases, when the base station 105-*a* or the UE 115-*a*, or both, disable one or more of the antenna panels 215, appropriate codebook management for wireless communication may be desirable.

The base station 105-*a* or the UE 115-*a* may support managing codebooks in response to disabling of one or more antenna ports associated with one or more antenna panels 215 (e.g., using a reduced number of antenna ports). In some examples, one or both of the base station 105-*a* or the UE 115-*a* may support use of different codebooks (e.g., fallback codebooks) associated with the CSI reporting configuration 220 for normal operations and power saving operations (e.g., reduced antenna ports). In some cases, antenna configurations may be implemented depending on the codebook type. There may be supported configurations of antenna elements ($N_1$, $N_2$) as well as number of panels ($N_g$) for each codebook type and corresponding number of CSI-RS antenna ports (e.g., $2N_gN_1N_2$ per resource).

For example, for a single antenna panel, the UE 115-*a* may declare (e.g., determine and flag or determine and indicate through signaling or transmission among other options) an error case for a single antenna panel based on whether the reduced antenna port configuration is not one of a legacy ($N_1$, $N_2$) antenna port configuration that is within the ($N_1$, $N_2$) configuration configured as part of a codebook configuration in the CSI reporting configuration 220. Similarly, the UE 115-*a* may declare (e.g., determine and flag or determine and indicate through signaling or transmission among other options) an error case for multi-panel antenna configurations that are within the ($N_g$, $N_1$, $N_2$) configuration configured is not part of a reduced antenna port configuration as indicated in the codebook configuration. Put another way, the UE 115-*a* may declare (e.g., determine and flag or determine and indicate through signaling or transmission among other options) an error case if there is no partially reduced antenna ($N_1$, $N_2$) configuration. In such cases, a fallback codebook may be based on a reduced ($N_1$, $N_2$) antenna port configuration that is indicated to the UE 115-*b*.

The UE 115-*a* may receive signaling indicating CSI-RS resources for CSI measurement and reporting, or a fallback codebook configuration separately or jointly. In some examples, the UE 115-*a* may determine CSI-RS resources (e.g., code division multiplexing (CDM) groups 230) that correspond to the disabled antenna ports, and perform CSI measurement and CSI reporting on CSI-RS resources that correspond to the enabled antenna ports. A CDM group size in a time domain may be 1, 2, or 4. A CDM group 240 may be a group of two or more resource elements 235. In the example of FIG. 2, the UE 115-*a* may support resources with 32 antenna ports of 4 CDM groups including a CDM group 240-*a* including two or more resource elements, a CDM group 240-*b* including two or more resource elements, a CDM group 240-*c* including two or more resource elements, and a CDM group 240-*d* including two or more resource elements. In some examples, an orthogonal cover code in a CDM group 240 may be one-dimensional binary Walsh codes or two-dimensional binary Walsh codes. In some cases, if the number of antenna ports is reduced to less than the number of antenna ports in a CDM group 240, the truncated orthogonal cover codes in the CDM group 240 may not be orthogonal.

In the example of FIG. 2, the UE 115-*a* may receive control signaling (e.g., an RRC message, a MAC-CE, a DCI) indicating a first codebook corresponding to a first number of antenna ports to utilize for communications with the base station 105-*a*. The UE 115-*a* may receive additional control signaling (e.g., an RRC message, a MAC-CE, a DCI)

indicating one or more second codebooks corresponding to an antenna port configuration 225 for a second number of antenna ports that is less than the first number of antenna ports. In some cases, such as those described by the present disclosure, the UE 115-*a* may utilize the one or more second codebooks as a fallback codebook. For example, as discussed above for a single antenna panel, the UE 115-*a* may declare (e.g., determine and flag or determine and indicate through signaling or transmission among other options) an error case for a single antenna panel based on whether the reduced antenna port configuration is not one of a legacy $(N_1, N_2)$ antenna port configuration that is not within (e.g., fully configured) the $(N_1, N_2)$ configuration configured as part of a codebook configuration in the CSI reporting configuration 220. Based on the determination, the UE 115-*a* may utilize the fallback codebook to implement a reduced number of antenna ports corresponding to the indicated antenna port configuration.

The operations performed by the base station 105-*a* and the UE 115-*a*, for example, may thus provide improvements to wireless communications in the wireless communications system 200. Additionally, the operations performed by the base station 105-*a* and the UE 115-*a* may provide improvements to the operation of the UE 115-*a*. For example, by supporting antenna adaptation according to codebook management in the wireless communications system 200, various operational characteristics, such as power consumption by the UE 115-*a*, may be reduced. The operations performed by the base station 105-*a* and the UE 115-*a* may also promote efficiency of the UE 115-*a* by reducing latency associated with processes related to high reliability and low latency wireless communications (such as, MIMO communications).

Figure 3:
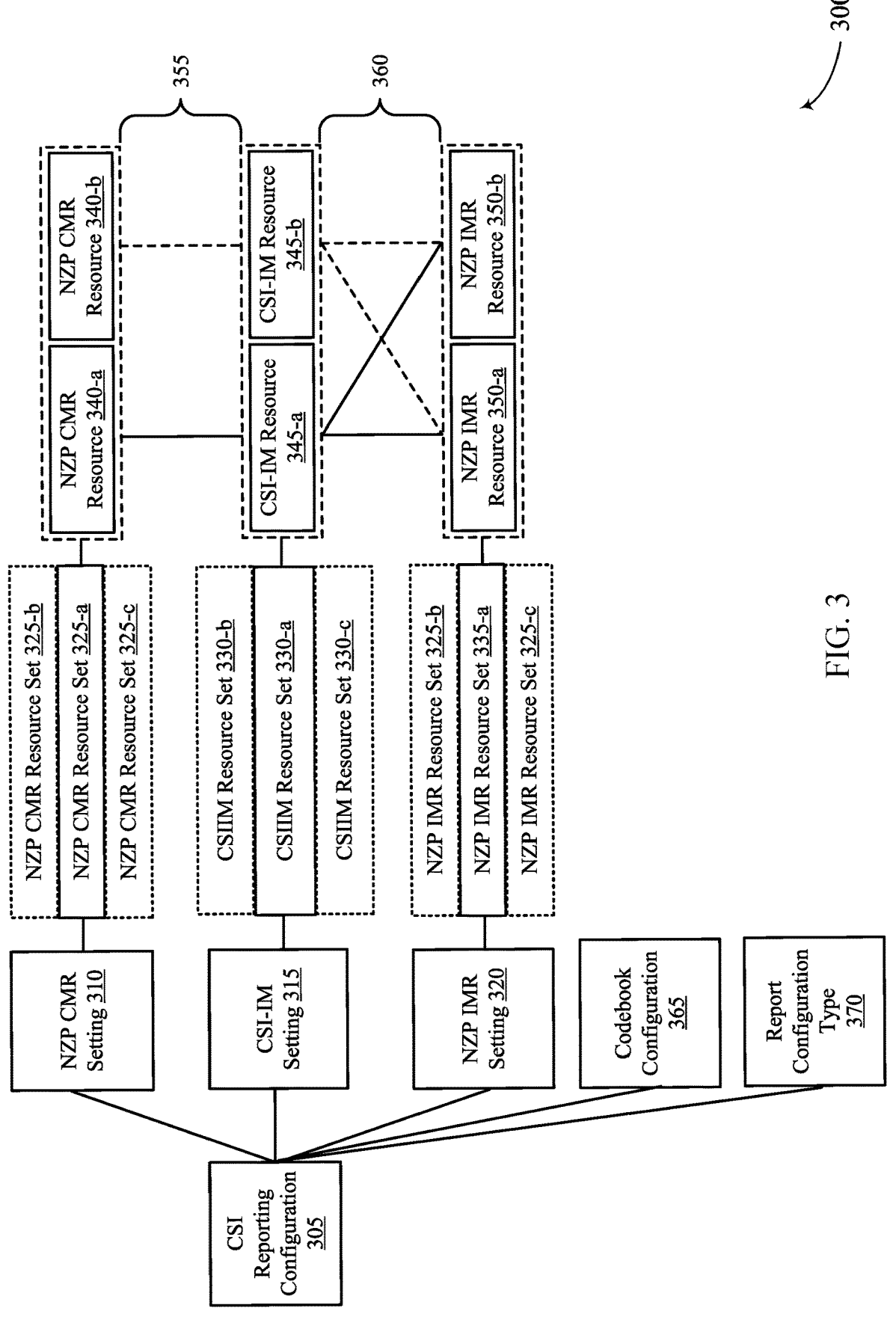
FIG. 3 illustrates an example of a CSI reporting configuration framework that supports codebook consideration for dynamic antenna adaptation in accordance with aspects of the present disclosure.

FIG. 3 illustrates an example of a CSI reporting configuration framework 300 that supports codebook consideration for dynamic antenna adaptation in accordance with aspects of the present disclosure. The CSI reporting configuration framework 300 may implement or be implemented by one or more aspects of the wireless communications system 100 and the wireless communications system 200 as described in FIGS. 1 and 2, respectively. For example, the CSI reporting configuration framework 300 may be implemented by a base station 105 and a UE 115 in a CSI reporting procedure supporting reduced antenna ports via fallback codebooks, as described with reference to FIGS. 1 and 2.

The CSI reporting configuration framework 300 may illustrate a process in which the UE 115 receives a CSI reporting configuration 305 from the network (e.g., from the base station 105) that may indicate one or more resources to use for a CSI measurement. The CSI reporting configuration 305 may implement or be implemented by one or more aspects of the CSI reporting configuration 220 as described in FIG. 1. For example, the UE 115 may receive a control message indicating the CSI reporting configuration 305. For example, the UE 115 may receive the control message, such as an RRC message, a MAC-CE, a DCI, or the like, including the CSI reporting configuration 305 (which may be equivalently referred to as a "CSI report config") that may link to one or more resource settings associated with different measurement types.

The CSI reporting configuration 305 may link to a setting for one or more of a non-zero power (NZP) CSI-RS resource for CMR 310, a CSI-RS resource for interference measurement (CSI-IM) 315, an NZP CSI-RS for interference measurement (NZP IMR) 320, or any combination thereof. Each resource setting of the one or more resource settings to which the CSI reporting configuration 305 links may be associated with multiple resources sets, but one active resource set (e.g., one active resource set). Additionally, or alternatively, the CSI reporting configuration 305 may link to a codebook configuration 365 or a report configuration type 370 (e.g., periodic, semi-persistent, aperiodic). In some examples, the UE 115 may perform periodic CSI reporting (e.g., the base station 105 may transmit higher layer signaling scheduling periodic CSI reports), aperiodic CSI reporting (e.g., the base station 105 may dynamically configure a CSI report), semi-persistent CSI reporting (e.g., the base station 105 may transmit higher layer signaling scheduling periodic CSI reports and may use dynamic signaling to trigger the periodic or aperiodic CSI reporting), or a combination.

The NZP-CMR setting 310 may be associated with one or more NZP CMR resource sets 325. For example, an NZP CMR resource set 325-*a* may be an active resource set, while an NZP CMR resource set 325-*b* and an NZP CMR resource set 325-*c* may be inactive resource sets. Similarly, the CSI-IM resource setting 315 may be associated with one or more CSI-IM resource set 330. For example, a CSI-IM resource set 330-*a* may be an active resource set, while a CSI-IM resource set 330-*b* and a CSI-IM resource sets 330-*c* may be inactive resource sets. Similarly, the NZP IMR setting 320 (e.g., NZP CSI-RS resource configuration for interference measurement) may be associated with one or more NZP IMR resource sets 335. For example, an NZP IMR Resource set 335-*a* may be an active resource set, while an NZP IMR Resource set 335-*b* and an NZP IMR Resource set 335-*c* may be inactive resource sets.

Each resource set may have one or more resources, which may be referred to as CSI-RS resources. For example, the NZP CMR resource set 325-*a* may include one or more resources, such as one or more NZP CMR resources 340 (e.g., an NZP CMR resource 340-*a* and an NZP CMR resource 340-*b*). In some examples, the NZP CMR resource 340-*a* may be associated with a transmission configuration indicator (TCI) state a1 (e.g., a first TCI state) and the NZP CMR resource 340-*b* may be associated with a TCI state a2 (e.g., a second TCI state). Similarly, the CSI-IM resource set 330-*a* may include one or more resources, such as one or more CSI-IM resources 345 (e.g., a CSI-IM resource 345-*a* associated with a TCI state b1 (e.g., a first TCI state) and a CSI-IM resource 345-*b* associated with a TCI state b2 (e.g., a second TCI state)). Similarly, the NZP IMR resource set 335-*a* may include one or more resources, such as one or more NZP IMR resources 350 (e.g., an NZP IMR resource 350-*a* associated with a TCI state c1 (e.g., a first TCI state) and an NZP IMR resource 350-*b* associated with a TCI state c2 (e.g., a second TCI state)).

Each CSI measurement resource within a resource set may be referred to as a CSI hypothesis. As illustrated, in the CSI reporting configuration framework 300, there may be a one-to-one mapping between each CMR or each CSI hypothesis (e.g., each CRI), and each CSI-IM resource. In other words, each CSI-RS resource for CSI measurement may be resource-wise associated with a CSI-IM resource based in part on the ordering of the CSI-RS resource and the CSI-IM resource in the corresponding resource set. The number of CSI-RS resources for CSI measurement may be equal to the number of CSI-IM resources. In some examples, the UE 115 may measure an interference by measuring the energy in the CSI-IM resource. A CSI-IM resource configuration might include resource elements for the UE 115 to measure the interference. Each CMR resource may be associated with all IMR resources.

FIG. 4A illustrates an example of a CSI reporting configuration framework 400-*a* that supports codebook consideration for dynamic antenna adaptation in accordance with aspects of the present disclosure. The CSI reporting configuration framework 400-*a* may implement or be implemented by one or more aspects of the wireless communications system 100 and the wireless communications system 200 as described in FIGS. 1 and 2, respectively. For example, the CSI reporting configuration framework 400-*a* may be implemented by a base station 105 and a UE 115 in a CSI reporting procedure utilizing one or more fallback codebooks, as described with reference to FIGS. 1 and 2. In the example of FIG. 4A, the CSI reporting configuration framework 400-*a* may support a common CSI-RS resource for different BWPs.

The CSI reporting configuration framework 400-*a* may include a first BPW 405-*a* and a second BWP 405-*b*. The first BWP 405-*a* may link to a first CSI reporting configuration 410-*a* (e.g., "a CSI report config 0"), while the second BWP 405-*b* may link to a second CSI reporting configuration 410-*b* (e.g., "a CSI report config 1"). As such, a CSI reporting configuration may be configured per BWP. The first CSI reporting configuration 410-*a* (e.g., "a CSI report config 0") may link to a first resource setting and resource set 415-*a*, while the second CSI reporting configuration 410-*b* (e.g., "a CSI report config 1") may link to a second resource setting and resource set 415-*b*.

In the example of FIG. 4A, the first resource setting and resource set 415-*a* and the second resource setting and resource set 415-*b* may link an NZP CSI-RS resource 420 (e.g., associated with 32 antenna ports). As such, CSI-RS resource for CSI measurement might not be BWP specific. In other words, CSI measurement can be performed by a UE on the CSI-RS resource that is common for multiple BWPs. By supporting a common CSI-RS resource for different BWPs, a UE 115 may reduce CSI-RS resource overhead for channel state feedback (CSF). As such, when the UE 115 determines CSI, the UE 115 may perform CSI reporting on the CSI-RS resource within a BWP linked to the CSI reporting.

FIG. 4B illustrates an example of a CSI reporting configuration framework 400-*b* that supports codebook consideration for dynamic antenna adaptation in accordance with aspects of the present disclosure. The CSI reporting configuration framework 400-*b* may implement or be implemented by one or more aspects of the wireless communications system 100 and the wireless communications system 200 as described in FIGS. 1 and 2, respectively. For example, the CSI reporting configuration framework 400-*b* may be implemented by a base station 105 and a UE 115 in a CSI reporting procedure utilizing one or more fallback codebooks, as described with reference to FIGS. 1 and 2. In the example of FIG. 4A, the CSI reporting configuration framework 400-*b* may support a common CSI-RS resource for different BWPs.

The CSI reporting configuration framework 400-*b* may include a first BPW 405-*a* and a second BWP 405-*b*. The first BWP 405-*a* may link to a first CSI reporting configuration 410-*a* (e.g., "a CSI report config 0"), while the second BWP 405-*b* may link to a second CSI reporting configuration 410-*b* (e.g., "a CSI report config 1"). As such, a CSI reporting configuration may be configured per BWP. The first CSI reporting configuration 410-*a* (e.g., "a CSI report config 0") may link to a first resource setting and resource set 415-*a*, while the second CSI reporting configuration 410-*b* (e.g., "a CSI report config 1") may link to a second resource setting and resource set 415-*b*.

In the example of FIG. 4B, the first resource setting and resource set 415-*a* and the second resource setting and resource set 415-*b* may link to different NZP CSI-RS resources. For example, the first resource setting and resource set 415-*a* may link to an NZP CSI-RS resource 425 (e.g., associated with 32 antenna ports), while the second resource setting and resource set 415-*b* may link to an NZP CSI-RS resource 430 (e.g., associated with 8 antenna ports). As such, CSI-RS resource for CSI measurement might be BWP specific. In other words, CSI measurement can be performed by a UE on separate CSI-RS resources that are separate for different BWPs. By supporting separate CSI-RS resources for different BWPs, the network (e.g., the base station 105) may implement dynamic antenna adaptation via dynamic BWP switching mechanism. However, in some cases, by supporting separate CSI-RS resources for different BWPs, CSI resource overhead might be higher than when the UE 115 supports common CSI-RS resources for different BWPs as described in FIG. 4A.

Figures 5A, 5B:
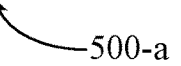
FIGS. 5A and 5B illustrate examples of CSI reporting configuration frameworks that support codebook consideration for dynamic antenna adaptation in accordance with aspects of the present disclosure.

FIG. 5A illustrates an example of a CSI reporting configuration framework 500-*a* that supports codebook consideration for dynamic antenna adaptation in accordance with aspects of the present disclosure. The CSI reporting configuration framework 500-*a* may implement or be implemented by one or more aspects of the wireless communications system 100 and the wireless communications system 200 as described in FIGS. 1 and 2, respectively. For example, the CSI reporting configuration framework 500-*a* may be implemented by a base station 105 and a UE 115 in a CSI reporting procedure, which may include using a fallback codebook for a reduced number of antenna ports, as described with reference to FIGS. 1 and 2.

For a single antenna panel, a UE 115 may determine an error case for a single antenna panel based on whether the reduced antenna port configuration is one of an existing codebook (e.g., a legacy codebook) including an $(N_1, N_2)$ antenna port configuration that is fully included within the $(N_1, N_2)$ configuration configured as part of a codebook configuration in a CSI reporting configuration, if a fallback codebook is not based on a reduced antenna port configuration, or both. For example, if a codebook configuration in the CSI reporting configuration indicates $(N_1, N_2)=(8,2)$ (e.g., 32-port), then the UE 115 may be unable to configure one or more $(N_1, N_2)$ configurations (e.g., since available configurations may be restricted based on a minimum number of antenna ports within a CDM). For example, if a minimum CDM group size is 8, the UE 115 may not configure any 12-port configurations (e.g., since 12 is not a multiple of 8), $(N_1, N_2)=(4,3)$ and $(N_1, N_2)=(12,1)$ for 24-port configurations, and $(N_1, N_2)=(4,4)$ and $(N_1, N_2)=(16,1)$ for 32-port configurations. In other cases, the UE 115 may utilize available antenna port configurations (e.g., from a fallback codebook) other than the antenna port configuration indicated in the CSI report configuration. For example, the UE 115 may determine, based on a fallback codebook, to allow a reduced $(N_1, N_2)$ configuration such as the 4-port configuration, any 8-port configuration, any 16-port configuration, and (6,2) for a 24-port configuration, as illustrated in FIG. 5A. In some examples, the UE 115 may receive second control signaling indicating a second antenna port configuration, where the UE 115 may utilize the second antenna port configuration as a fallback codebook, a reduced codebook, or both. In some cases, the second antenna port configuration may correspond to a subset associated with the codebook configuration in the CSI reporting configuration.

FIG. 5B illustrates a CSI reporting configuration framework 500-*b* that supports codebook consideration for dynamic antenna adaptation in accordance with one or more aspects of the present disclosure. The CSI reporting configuration framework 500-$b$ may implement or be implemented by one or more aspects of the wireless communications system 100 and the wireless communications system 200 as described in FIGS. 1 and 2, respectively. For example, the CSI reporting configuration framework 500-$b$ may be implemented by a base station 105 and a UE 115 in a CSI reporting procedure, which may include utilizing a fallback codebook for reduced antenna ports, as described with reference to FIGS. 1 and 2.

In the example of FIG. 5B, if a codebook configuration in a CSI reporting configuration indicates $(N_1, N_2)=(6,2)$ (e.g., 24-port), then the UE 115 may be unable to configure one or more $(N_1, N_2)$ configurations. For example, a UE 115 may not configure $(N_1, N_2)=(4,1)$ for 8-port configurations, $(N_1, N_2)=(8,1)$ for 16-port configurations, and $(N_1, N_2)=(4,3)$ and $(N_1, N_2)=(12,1)$ for 24 port configurations. In such cases, the UE 115 may determine an error case to utilize available antenna port configurations (e.g., from a fallback codebook) to reduce a number of utilized antenna ports. For example, the UE 115 may determine to allow reduced $(N_1, N_2)$ configuration such as all 4-port configurations, $(2,2)$ 8-port configuration, $(2,2)$ for 8-port configurations, all 12-port configurations, $(4,2)$ for 16-port configurations, or all 32-port configurations.

FIG. 6A illustrates an example of a CSI reporting configuration framework 600-$a$ that supports codebook consideration for dynamic antenna adaptation in accordance with aspects of the present disclosure. The CSI reporting configuration framework 600-$a$ may implement or be implemented by one or more aspects of the wireless communications system 100 and the wireless communications system 200 as described in FIGS. 1 and 2, respectively. For example, the CSI reporting configuration framework 600-$a$ may be implemented by a base station 105 and a UE 115 in a CSI reporting procedure, which may include utilizing a fallback codebook for reduced antenna ports, as described with reference to FIGS. 1 and 2.

For a multi-panel antenna port configurations, a UE 115 may determine an error case for multiple panels based on whether the reduced antenna port configuration is one of an existing multi-panel codebook (e.g., a legacy codebook) $(N_g, N_1, N_2)$ antenna port configuration that is fully included within the $(N_g, N_1, N_2)$ configuration configured as part of a codebook configuration in the CSI reporting configuration. Additionally, the UE 115 may determine an error case if the number of panels $N_g$ cannot be reduced first before reducing (N1, N2) when the number of antenna ports is dynamically configured (e.g., via a CSI reporting configuration). The fallback codebook may be based on the reduced $(N_1, N_2)$ antenna port configuration that is indicated to the UE 115. In some cases, the UE 115 may receive a second antenna port configuration, which may correspond to a subset of the antenna port configuration in the CSI reporting configuration.

For example, if a codebook configuration in the CSI reporting configuration indicates $(N_g, N_1, N_2)=(4,2,2)$ (e.g., 32-port), then the UE 115 may be unable to configure one or more $(N_g, N_1, N_2)$ configurations. For example, the UE may not be able to configure any $(N_g, N_1, N_2)=(2,8,1)$, $(N_g, N_1, N_2)=(4,4,1)$, or $(N_g, N_1, N_2)=(2,4,2)$ for 32-port configurations. The UE 115 may determine an error case to utilize available port configurations (e.g., from the fallback codebook) other than the antenna port configuration indicated in the CSI report configuration. For example, the UE 115 may determine, based on a fallback codebook, to allow reduced $(N_g, N_1, N_2)$ configurations such as the 8-port configuration, or any 16-port configuration, as illustrated in FIG. 6A.

FIG. 6B illustrates CSI reporting configuration framework 600-$b$ that supports codebook consideration for dynamic antenna adaptation in accordance with one or more aspects of the present disclosure. The CSI reporting configuration framework 600-$b$ may implement or be implemented by one or more aspects of the wireless communications system 100 and the wireless communications system 200 as described in FIGS. 1 and 2, respectively. For example, the CSI reporting configuration framework 600-$b$ may be implemented by a base station 105 and a UE 115 in a CSI reporting procedure, which may include utilizing a fallback codebook for reduced antenna ports, as described with reference to FIGS. 1 and 2.

In the example of FIG. 6B, if a codebook configuration in a CSI reporting configuration indicates $(N_g, N_1, N_2)=(4,4,1)$ (e.g., 32-port), then the UE 115 may be unable to configure one or more $(N_g, N_1, N_2)$ configurations. For example, the UE 115 may not configure $(N_g, N_1, N_2)=(2,2,2)$ for 16-port configurations, and $(N_g, N_1, N_2)=(2,8,1)$, $(N_g, N_1, N_2)=(2, 4,2)$, or $(N_g, N_1, N_2)=(4,2,2)$ for 32-port configurations. In such cases, the UE 115 may determine an error case to utilize available port configurations (e.g., from the fallback codebook) other than the port configuration indicated in the CSI report configuration. For example, the UE 115 may determine, based on a fallback codebook, to allow a reduced $(N_g, N_1, N_2)$ configuration such as the 8-port configuration, or $(N_g, N_1, N_2)=(2,4,1)$ and $(N_g, N_1, N_2)=(4,2,1)$ for 16-port configuration, as illustrated in FIG. 6B.

FIG. 7 illustrates an example of a single antenna panel configuration table 700 that supports codebook consideration for dynamic antenna adaptation in accordance with aspects of the present disclosure. The single antenna panel configuration table 700 may be implemented by one or more aspects of the wireless communications system 100 and the wireless communications system 200 as described in FIGS. 1 and 2, respectively. For example, the single antenna panel configuration table 700 may be implemented by a base station 105 and a UE 115 in a CSI reporting procedure, which may include utilizing a fallback codebook for reduced antenna ports, as described with reference to FIGS. 1 through 6.

The single antenna panel configuration table 700 may be utilized by one or more UEs 115 in determining a reduced antenna port configuration. For example, a UE 115 may utilize one or more codebooks to determine a single antenna panel port configuration as indicated by a CSI report configuration. A UE 115 may receive an antenna port configuration (e.g., $(N_1, N_2)$) via a CSI report configuration. The UE 115 may evaluate a codebook (e.g., port configuration indicated by one or more CSI report configuration 705) to determine a number of horizontal antenna ports and a number of vertical antenna ports to utilize for subsequent configuration. In some cases, however, the UE 115 may determine a reduced antenna configuration set based on one or more fallback codebooks. Additionally or alternatively, the UE 115 may receive a second antenna port configuration associated with a second control signal. The second antenna port configuration may correspond to a reduced antenna port configuration. In some examples, the second antenna port configuration may correspond to a subset of antenna port configurations associated with the CSI report configuration and the associated antenna port configuration.

The UE 115 may receive an antenna port configuration $(3,2)$ from a CSI report configuration 705. Based on a fallback codebook (e.g., which may be initiated by an error case, as discussed with reference to FIGS. 5A, 5B, 6A, and 6B), the UE 115 may determine a set of reduced antenna configurations. For example, the UE 115 may determine that the antenna port configuration (3,2) may be reduced to (2,1) or (2,2), which may reduce power consumed at a base station 105 by utilizing fewer antenna ports than the indicated antenna port configuration. Additionally, the UE 115 may determine a reduced antenna configuration index 710 corresponding to the reduced antenna port configuration. In some cases, the reduced antenna port configuration index may be determined based on a CSI resource configuration, such as in situations discussed with reference to FIGS. 5A, 5B, 6A, and 6B. For example, the UE 115 may determine from the reduced antenna port configurations (2,1) and (2,2) that corresponding reduced antenna configuration indices may be 0 and 1, as illustrated in FIG. 7.

FIG. 8 illustrates an example of a multi-panel antenna configuration table 800 that supports codebook consideration for dynamic antenna adaptation in accordance with aspects of the present disclosure. The multi-panel antenna configuration table 800 may be implemented by one or more aspects of the wireless communications system 100 and the wireless communications system 200 as described in FIGS. 1 and 2, respectively. For example, the multi-panel antenna configuration table 800 may be implemented by a base station 105 and a UE 115 in a CSI reporting procedure, which may include utilizing a fallback codebook for reduced antenna ports, as described with reference to FIGS. 1 through 7.

The multi-panel antenna configuration table 800 may be utilized by one or more UEs 115 in determining a reduced antenna port configuration. A UE 115 may utilize one or more codebooks to determine a multi-panel antenna port configuration as indicated by a CSI report configuration 805. The UE 115 may receive an antenna port configuration (e.g., ($N_g$, $N_1$, $N_2$)) via the CSI report configuration 805. In some examples, the UE 115 may receive a second antenna port configuration, which may correspond to a reduced antenna port configuration, may correspond to a subset of the antenna port configuration, or both. The UE 115 may evaluate a codebook (e.g., port configuration indicated by one or more CSI report configuration 805) to determine a number of panels, a number of horizontal antenna ports, and a number of vertical antenna ports to utilize for subsequent configuration. In some cases, however, the UE 115 may determine a reduced antenna configuration set based on one or more fallback codebooks.

The UE 115 may receive an antenna port configuration (2,2,2) from the CSI report configuration 805. Based on a fallback codebook (e.g., which may be initiated by an error case, as discussed with reference to FIGS. 5A, 5B, 6A, and 6B), the UE 115 may determine a set of reduced antenna configurations. For example, the UE 115 may determine that the antenna port configuration (2,2,2) may be reduced to (1,2,1), (1,2,2), and (2,2,1), which may reduce power consumed at a base station by utilizing fewer antenna panels and antenna ports than the indicated antenna port configuration. Additionally, the UE 115 may determine a reduced antenna configuration index 810 corresponding to the reduced antenna port configuration. In some cases, the reduced antenna configuration index 810 may be determined based on the CSI resource configuration.

The available reduced antenna port configurations may be restricted based on the indicated antenna port configurations, such that the reduced configurations available may be fewer than the total number of determined configurations. For example, the UE 115 may determine that the available antenna port configurations may correspond to antenna port configurations enclosed by dashed boxes, as illustrated in FIG. 8. In this case, while the CSI report configuration 805 may indicate (2,2,2), the UE 115 may determine that, while (1,2,1), (1,2,2), and (2,2,1) may be correspond to reduced antenna configurations, (1,2,1) and (1,2,2) may be the available antenna configurations for the corresponding CSI report configuration. In such cases, the UE 115 may utilize a reduced antenna configuration index (e.g., 0 and 1) to implement a reduced antenna configuration from the fallback codebook.

Figure 9:
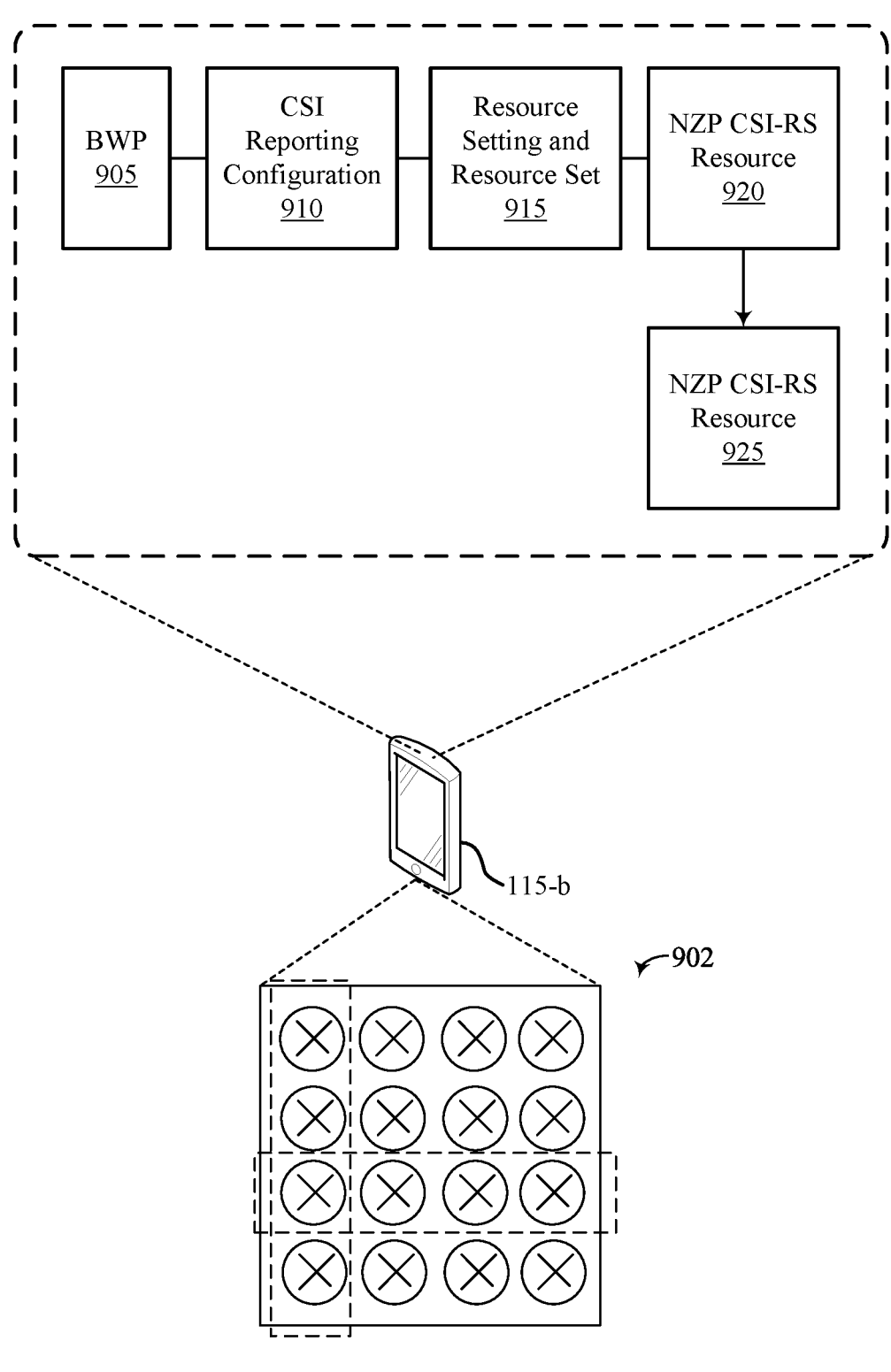
FIG. 9 illustrates an example of a CSI reporting configuration framework that supports codebook consideration for dynamic antenna adaptation in accordance with aspects of the present disclosure.

FIG. 9 illustrates an example of a CSI reporting configuration framework 900 that supports codebook consideration for dynamic antenna adaptation in accordance with aspects of the present disclosure. The CSI reporting configuration framework 900 may implement or be implemented by one or more aspects of the wireless communications system 100 and the wireless communications system 200 as described in FIGS. 1 and 2, respectively. For example, the CSI reporting configuration framework 900 may be implemented by a UE 115-*b* in a CSI reporting procedure, which may include utilizing a fallback codebook for reduced antenna ports, as described with reference to FIGS. 1 through 8.

The UE 115-*b* may support an antenna configuration 902 where the number of antenna elements $N_1$ may be equal to 4 (e.g., $N_1$=4), the number of antenna elements $N_2$ may be equal to 4 (e.g., $N_2$=4), and the number of antenna panels $N_g$ may be equal 1 (e.g., $N_g$=1). As such, the UE 115-*b* may support 32 antenna ports as described with reference to FIG. 2. The CSI reporting configuration framework 900 may support reduced antenna ports for CSI measurement and CSI reporting. For example, the UE 115-*b* may determine a reduced antenna port configuration based on one or more control signaling, one or more subsets of one or more control signals, or both. The CSI reporting configuration framework 900 may be associated with a BWP 905. The BWP 905 may link to a CSI reporting configuration 910 (e.g., "a CSI report config 0"). The CSI reporting configuration 910 (e.g., "a CSI report config 0") may link to a resource setting and resource set 915. The resource setting and resource set 915 may link to an NZP CSI-RS resource 920, which may be associated with 32 antenna ports. The NZP CSI-RS resource 920 may be RRC configured as part of the CSI reporting configuration 910.

In some examples, the base station may transmit, and the UE 115-*b* may receive, an indication of a subset of antenna ports from the RRC-configured antenna ports for the NZP CSI-RS resource 920 via a MAC-CE or a DCI. For example, the base station 105 may transmit, and the UE 115 may receive, an indication of a reduced number of antenna ports (e.g., 8 antenna ports) for NZP CSI-RS resource 925 (which may be the same as the NZP CSI-RS resource 920, a subset of the NZP CSI-RS resource 920, or both) via a MAC-CE or a DCI. As such, the NZP CSI-RS resource 920 may be the same, but may be associated with the reduced number of antenna ports (e.g., 8 antenna ports, which may correspond to a subset of the NZP CSI-RS resource 920). The UE 115-*b* may perform CSI measurement and CSI reporting based on the configured CSI-RS resource (e.g., NZP CSI-RS resource) from the CSI reporting configuration 910 and the indicated reduced number of antenna ports via the MAC-CE or the DCI.

Additionally or alternatively, the base station 105 may transmit, and the UE 115-*b* may receive, an indication of K subsets of antenna ports selected from the RRC-configured N antenna ports for a CSI-RS resource (e.g., NZP CSI-RS resource 920). In some examples, the base station may transmit, and the UE 115-*b* may receive, via a MAC-CE, an indication to down-select L subsets of antenna ports from the K subsets of antenna ports. In some examples, the base station may transmit, and the UE 115-*b* may receive, via a DCI, an indication to select a value from the L subsets of antenna ports.

In some examples, a fallback codebook, corresponding to a reduced antenna port configuration for the antenna configuration 902, may be dynamically indicated to the UE 115-*b*. For example, MAC-CE, DCI, or both may indicate a reduced antenna configuration index, while a set of fallback codebooks associated with the reduced antenna configuration index corresponding to a full antenna configuration may be configured via RRC. Alternatively, DCI may indicate a fallback codebook associated with the reduced antenna configuration index while MAC-CE indicates a set of codebooks associated with the reduced antenna configuration set. In some examples, for each reduced antenna configuration, there may be an associated discrete Fourier transform (DFT) beam restriction and an associated RI restriction. The UE 115-*b* may transmit wireless communications based on one or both of the DFT restriction and RI restriction.

Figure 10:
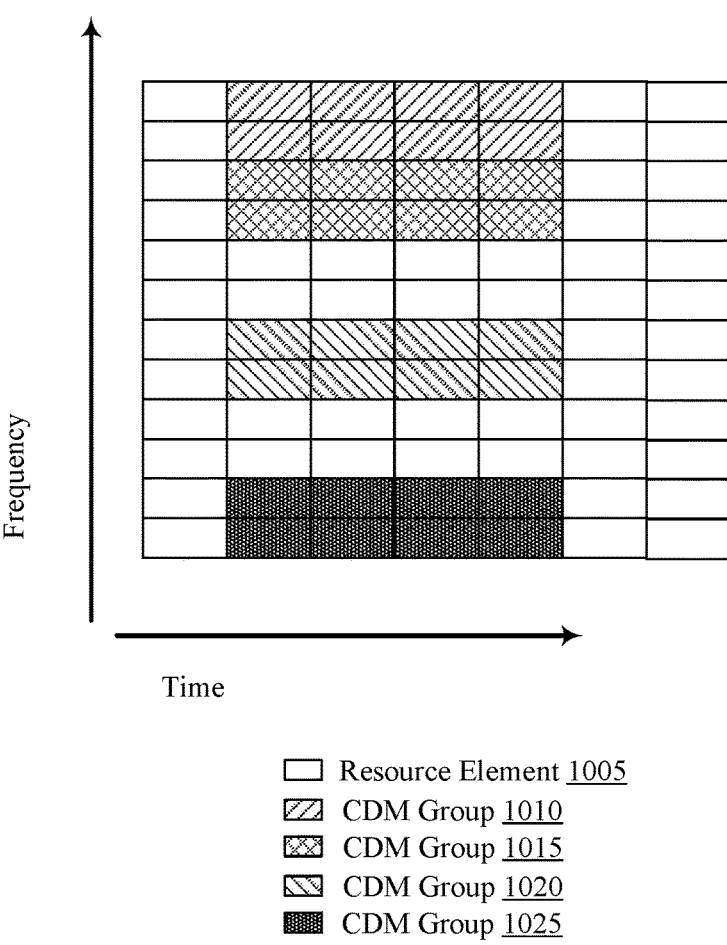
FIG. 10 illustrates an example of a code division multiplexing (CDM) group that supports codebook consideration for dynamic antenna adaptation in accordance with aspects of the present disclosure.

FIG. 10 illustrates an example of a CDM groups 1000 that supports codebook consideration for dynamic antenna adaptation in accordance with aspects of the present disclosure. The CDM groups 1000 may implement or be implemented by one or more aspects of the wireless communications system 100 and the wireless communications system 200 as described in FIGS. 1 and 2, respectively. For example, the CDM groups 1000 may be implemented by a base station 105 and a UE 115 in a CSI reporting procedure, which may include utilizing a fallback codebook for reduced antenna ports, as described with reference to FIGS. 1 through 9.

The UE 115 may utilize a joint indication for reduced antenna ports and CSI-RS resources. For example, the CSI-RS resource for CSI measurement and fallback codebook configuration may be jointly indicated. For example, a CSI-RS resource with 32 antenna ports using 4 CDM groups (e.g., CDM groups 1010, 1015, 1020, and 1025) may indicate a reduced ($N_1$, $N_2$) configuration as well as indices for a single antenna panel or a subset of reduced ($N_g$, $N_1$, $N_2$) multi-panel antenna configuration. For example, the UE 115 may receive a CSI report configuration of (4,4), which may correspond to (2,1), (2,2), (4,1), (3,2) (4,2), and (4,3) reduced antenna port configurations. Additionally, such reduced antenna port configurations may correspond to reduced configuration indices 0, 1, 2, 3, 4, 5, and 6 respectively. However, in some cases, the UE 115 may utilize reduced antenna port configurations corresponding to a multiple of a CDM size. In such cases (e.g., such as in FIG. 10, where a multiple of CDM size is 8), the number of ports for reduced CSI-RS is smaller than the total determined reduced antenna port configuration. The UE 115 may determine that configurations (2,2), (4,1), (4,2) and (4,3) (e.g., corresponding to configuration indices 1, 2, 4, 5, and 6) correspond to a multiple of a CDM size. As such, the UE 115 may implement one of the configurations that is a multiple of the CDM size.

Figure 11:
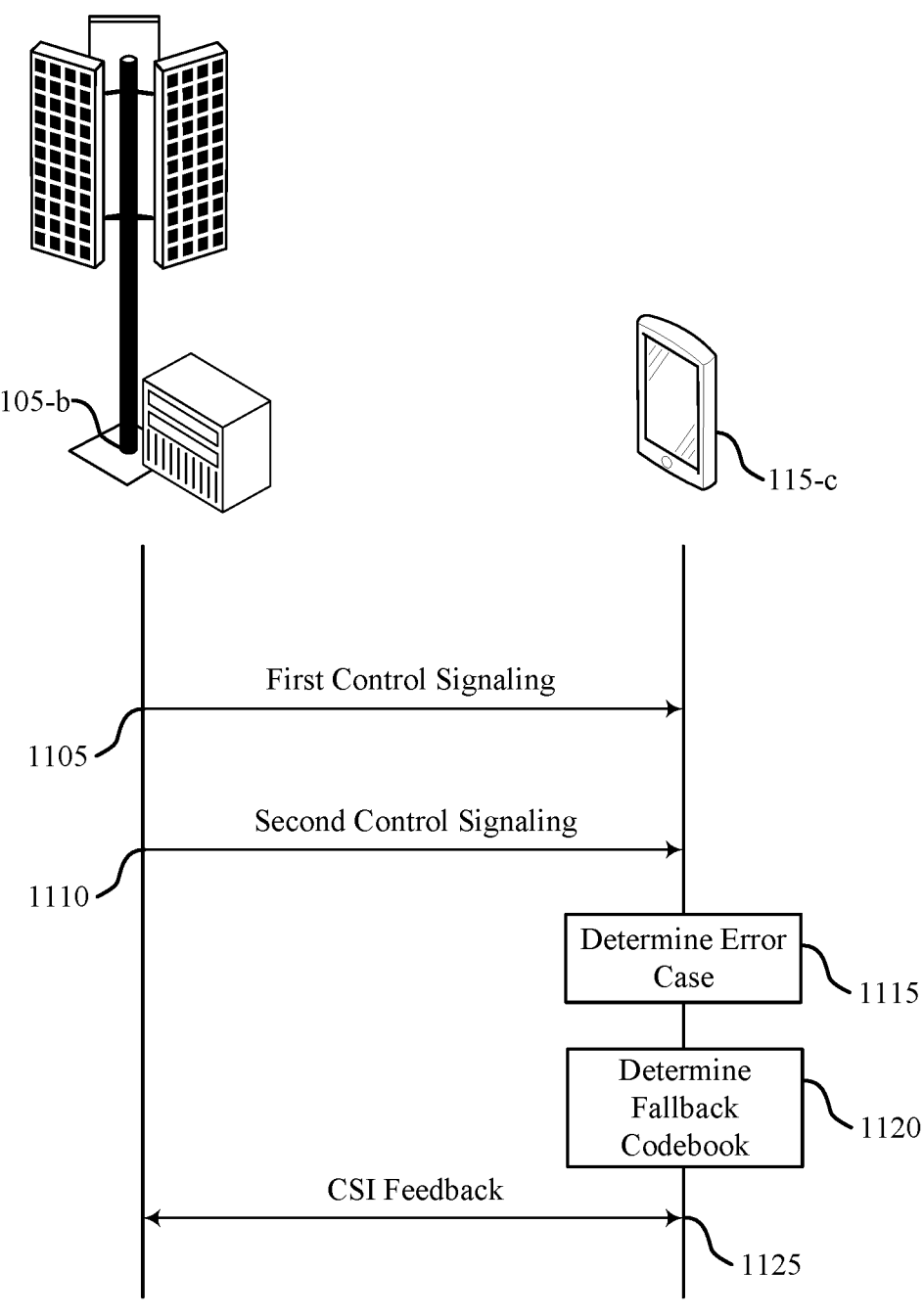
FIG. 11 illustrates an example of a process flow that supports codebook consideration for dynamic antenna adaptation in accordance with aspects of the present disclosure.

FIG. 11 illustrates an example of a process flow 1100 that supports codebook consideration for dynamic antenna adaptation in accordance with aspects of the present disclosure. The process flow 1100 may be implemented by one or more aspects of the wireless communications system 100 and the wireless communications system 200. For example, the process flow 1100 may correspond to communications between a UE 115-*c* and a base station 105-*b*, which may be examples of the UE 115 and the base station 105 as described with reference to FIG. 1. It should be noted that, while examples are discussed below, any number of devices and device types may be used to accomplish implementations described in the present disclosure. In the following description of the process flow 1100, operations between the UE 115-*c* and the base station 105-*b* may occur in a different order or at different times than as shown. Some operations may also be omitted from the process flow 1100, and other operations may be added to the process flow 1100.

At 1105, the UE 115-*c* may receive, from the base station 105-*b*, first control signaling indicating a first antenna port configuration of a set of antenna port configurations associated with the UE 115-*c*. Additionally, the first antenna port configuration may be determined based on a first codebook of a set of codebooks corresponding to the UE 115-*c*. At 1110, the UE 115-*c* may receive, from the base station 105-*b*, second control signaling indicating a second antenna port configuration that implements fewer antenna ports than the first antenna port configuration. In some examples, the second antenna port configuration may correspond to a subset of the first antenna port configuration.

At 1115, the UE 115-*c* may determine an error case (e.g., such as those described with reference to FIGS. 5A, 5B, 6A, and 6B). If the UE 115-*c* determines an error case, the UE 115-*c* may determine a fallback codebook that implements a reduced number of antenna ports while satisfying one or more conditions associated with the first antenna port configuration (e.g., a multiple of an indicated CDM group). At 1120, the UE 115-*c* may determine a fallback codebook based on the determination of an error condition corresponding to the first and second codebook. Accordingly, the UE 115-*c* may implement the fallback codebook corresponding to a reduced number of antenna ports. At 1125, the UE 115-*c* may transmit CSI feedback (e.g., a CSI report) with the base station 105-*b* according to the implemented fallback codebook.

Figure 12:
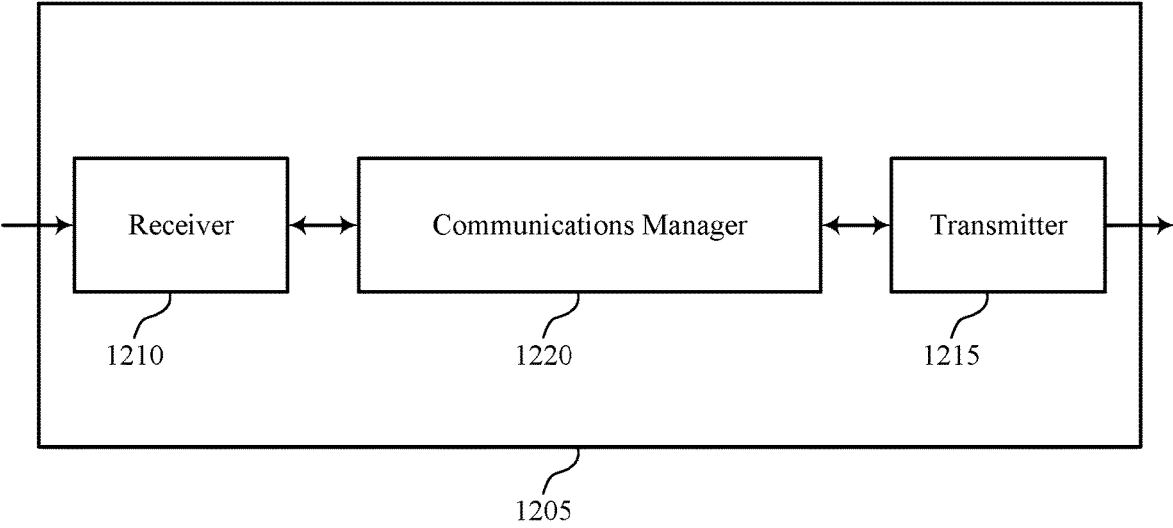

FIG. 12 shows a block diagram 1200 of a device 1205 that supports codebook consideration for dynamic antenna adaptation in accordance with aspects of the present disclosure. The device 1205 may be an example of aspects of a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to codebook consideration for dynamic antenna adaptation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, or information channels related to codebook consideration for dynamic antenna adaptation). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of codebook consideration for dynamic antenna adaptation as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at the device 1205 (e.g., a UE) in accordance with examples as disclosed herein. For example, the communications manager 1220 may be configured as or otherwise support a means for receiving, from a base station, first control signaling indicating a first codebook configuration associated with a first CSI-RS antenna port configuration. The communications manager 1220 may be configured as or otherwise support a means for receiving, from the base station, second control signaling indicating a second codebook configuration associated with a second CSI-RS antenna port configuration, where the second CSI-RS antenna port configuration includes fewer antenna ports than the first CSI-RS antenna port configuration. The communications manager 1220 may be configured as or otherwise support a means for performing a CSI measurement based on the first codebook configuration and the second codebook configuration. The communications manager 1220 may be configured as or otherwise support a means for transmitting, to the base station, a CSI report based on the CSI measurement.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced power consumption.

FIG. 13 shows a block diagram 1300 of a device 1305 that supports codebook consideration for dynamic antenna adaptation in accordance with aspects of the present disclosure. The device 1305 may be an example of aspects of a device 1205 or a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, or information channels related to codebook consideration for dynamic antenna adaptation). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, or information channels related to codebook consideration for dynamic antenna adaptation). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of codebook consideration for dynamic antenna adaptation as described herein. For example, the communications manager 1320 may include a codebook component 1325 a CSI component 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at the device 1305 (e.g., a UE) in accordance with examples as disclosed herein. The codebook component 1325 may be configured as or otherwise support a means for receiving, from a base station, first control signaling indicating a first codebook configuration associated with a first CSI-RS antenna port configuration. The codebook component 1325 may be configured as or otherwise support a means for receiving, from the base station, second control signaling indicating a second codebook configuration associated with a second CSI-RS antenna port configuration, where the second CSI-RS antenna port configuration includes fewer antenna ports than the first CSI-RS antenna port configuration. The CSI component 1330 may be configured as or otherwise support a means for performing a CSI measurement based on the first codebook configuration and the second codebook configuration. The CSI component 1330 may be configured as or otherwise support a means for transmitting, to the base station, a CSI report based on the CSI measurement.

Figure 14:
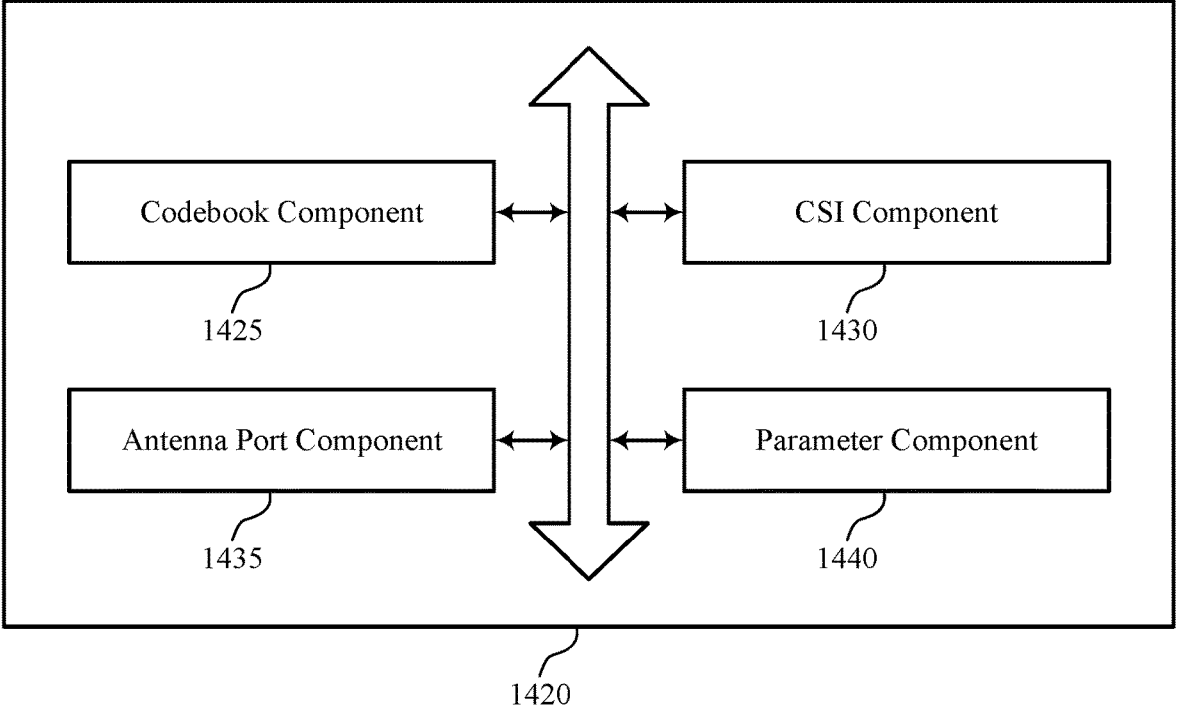
FIG. 14 shows a block diagram of a communications manager that supports codebook consideration for dynamic antenna adaptation in accordance with aspects of the present disclosure.

FIG. 14 shows a block diagram 1400 of a communications manager 1420 that supports codebook consideration for dynamic antenna adaptation in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of codebook consideration for dynamic antenna adaptation as described herein. For example, the communications manager 1420 may include a codebook component 1425, a CSI component 1430, an antenna port component 1435, a parameter component 1440, or any combination thereof. Each of these components may communicate, directly or indirectly, with one another (e.g., via one or more buses).

The communications manager 1420 may support wireless communication at a UE in accordance with examples as disclosed herein. The codebook component 1425 may be configured as or otherwise support a means for receiving, from a base station, first control signaling indicating a first codebook configuration associated with a first CSI-RS antenna port configuration. In some examples, the codebook component 1425 may be configured as or otherwise support a means for receiving, from the base station, second control signaling indicating a second codebook configuration associated with a second CSI-RS antenna port configuration, where the second CSI-RS antenna port configuration includes fewer antenna ports than the first CSI-RS antenna port configuration. The CSI component 1430 may be configured as or otherwise support a means for performing a CSI measurement based on the first codebook configuration and the second codebook configuration. In some examples, the CSI component 1430 may be configured as or otherwise support a means for transmitting, to the base station, a CSI report based on the CSI measurement.

In some examples, the codebook component 1425 may be configured as or otherwise support a means for determining that one or both of the first codebook configuration or the second codebook configuration includes a set of codebooks. In some examples, the CSI component 1430 may be configured as or otherwise support a means for performing the CSI measurement further based on at least one codebook of the set of codebooks being associated with one or both of the first codebook configuration or the second codebook configuration.

In some examples, the codebook component 1425 may be configured as or otherwise support a means for receiving third control signaling indicating the at least one codebook of the set of codebooks being associated with one or both of the first codebook configuration or the second codebook configuration. In some examples, the CSI component 1430 may be configured as or otherwise support a means for performing the CSI measurement further based on the third control signaling indicating the at least one codebook of the set of codebooks. In some examples, to support receiving the third control signaling, the codebook component 1425 may be configured as or otherwise support a means for receiving one or more of a RRC message, DCI, or a MAC-CE, indicating the at least one codebook of the set of codebooks being associated with one or both of the first codebook configuration or the second codebook configuration.

In some examples, to support receiving the first control signaling, the CSI component 1430 may be configured as or otherwise support a means for receiving a CSI reporting configuration, the CSI reporting configuration indicating the first codebook configuration associated with the first CSI-RS antenna port configuration. In some examples, to support receiving the first control signaling, the codebook component 1425 may be configured as or otherwise support a means for receiving one or more of a RRC message, DCI, or a MAC-CE, indicating the first codebook configuration associated with the first CSI-RS antenna port configuration.

In some examples, to support receiving the second control signaling, the codebook component 1425 may be configured as or otherwise support a means for receiving one or more of a RRC message, DCI, or a MAC-CE, indicating the second codebook configuration associated with the second CSI-RS antenna port configuration. In some examples, the codebook component 1425 may be configured as or otherwise support a means for receiving jointly the first control signaling indicating the first codebook configuration associated with the first CSI-RS antenna port configuration and the second control signaling indicating the second codebook configuration associated with the second CSI-RS antenna port configuration.

In some examples, to support receiving the second control signaling, the antenna port component 1435 may be configured as or otherwise support a means for receiving a CSI-RS antenna port configuration index associated with the second CSI-RS antenna port configuration. In some examples, to support receiving the second control signaling, the CSI component 1430 may be configured as or otherwise support a means for performing the CSI measurement further based on the CSI-RS antenna port configuration index. In some examples, the parameter component 1440 may be configured as or otherwise support a means for determining one or both of a DFT beam restriction or a rank indicator restriction based on the second codebook configuration associated with the second CSI-RS antenna port configuration. In some examples, the CSI component 1430 may be configured as or otherwise support a means for performing the CSI measurement further based on one or both of the DFT beam restriction or the rank indicator restriction.

In some examples, to support receiving the second control signaling, the codebook component 1425 may be configured as or otherwise support a means for receiving jointly a first indication of the second codebook configuration associated with the second CSI-RS antenna port configuration and a second indication of a set of CSI-RS resources for the CSI measurement. In some examples, to support receiving the second control signaling, the CSI component 1430 may be configured as or otherwise support a means for performing the CSI measurement further based on the second codebook configuration and the set of CSI-RS resources.

In some examples, to support performing the CSI measurement, the CSI component 1430 may be configured as or otherwise support a means for performing the CSI measurement on a decreased number of antenna elements of a set of antenna elements and based on the second codebook configuration. In some examples, to support performing the CSI measurement, the CSI component 1430 may be configured as or otherwise support a means for performing the CSI measurement on a decreased number of antenna panels of a set of antenna panels and based on the second codebook configuration.

In some examples, the second CSI-RS antenna port configuration includes a preconfigured CSI-RS antenna port configuration and is entirely included within the first CSI-RS antenna port configuration. In some examples, one or both of the first codebook configuration or the second codebook configuration corresponds to one or more antenna panels.

Figure 15:
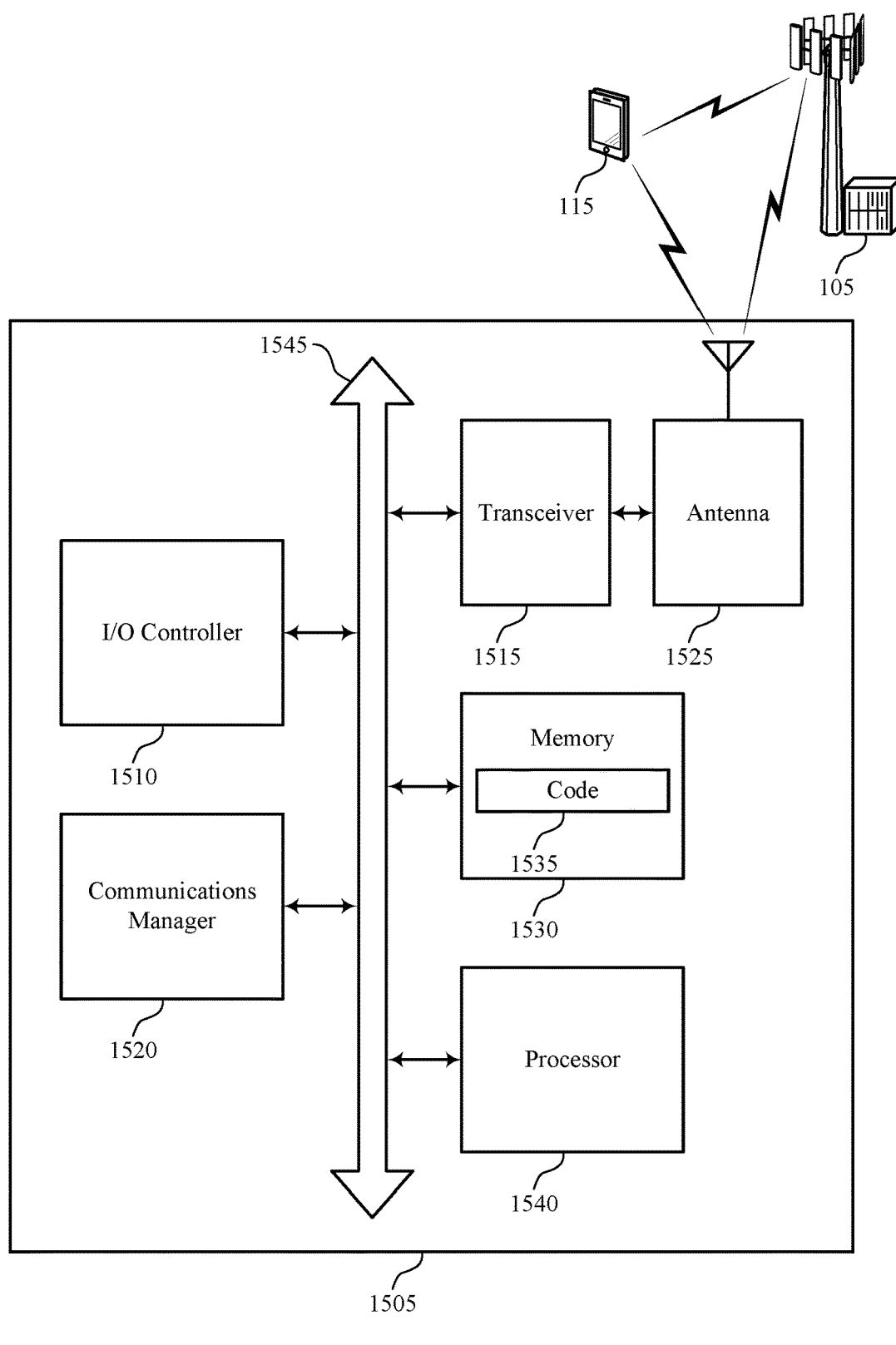
FIG. 15 shows a diagram of a system including a device that supports codebook consideration for dynamic antenna adaptation in accordance with aspects of the present disclosure.

FIG. 15 shows a diagram of a system 1500 including a device 1505 that supports codebook consideration for dynamic antenna adaptation in accordance with aspects of the present disclosure. The device 1505 may be an example of or include the components of a device 1205, a device 1305, or a UE 115 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include random access memory (RAM) and read-only memory (ROM). The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a basic I/O system (BIOS) which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting codebook consideration for dynamic antenna adaptation). For example, the device 1505 or a component of the device 1505 may include a processor 1540 and memory 1530 coupled to the processor 1540, the processor 1540 and memory 1530 configured to perform various functions described herein.

The communications manager 1520 may support wireless communication at the device 1505 (e.g., a UE) in accordance with examples as disclosed herein. For example, the communications manager 1520 may be configured as or otherwise support a means for receiving, from a base station, first control signaling indicating a first codebook configuration associated with a first CSI-RS antenna port configuration. The communications manager 1520 may be configured as or otherwise support a means for receiving, from the base station, second control signaling indicating a second codebook configuration associated with a second CSI-RS antenna port configuration, where the second CSI-RS antenna port configuration includes fewer antenna ports than the first CSI-RS antenna port configuration. The communications manager 1520 may be configured as or otherwise support a means for performing a CSI measurement based on the first codebook configuration and the second codebook configuration. The communications manager 1520 may be configured as or otherwise support a means for transmitting, to the base station, a CSI report based on the CSI measurement.

By including or configuring the communications manager 1520 in accordance with examples as described herein, the device 1505 may support techniques for improved communication reliability, reduced latency, and reduced power consumption.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of codebook consideration for dynamic antenna adaptation as described herein, or the processor 1540 and the memory 1530 may be otherwise configured to perform or support such operations.

Figure 16:
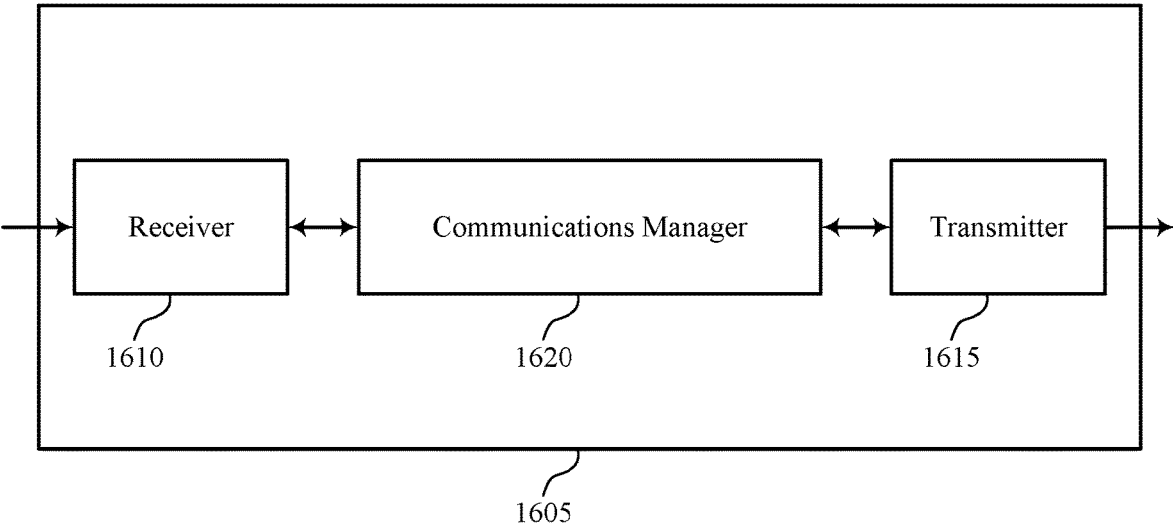
FIGS. 16 and 17 show block diagrams of devices that support codebook consideration for dynamic antenna adaptation in accordance with aspects of the present disclosure.

FIG. 16 shows a block diagram 1600 of a device 1605 that supports codebook consideration for dynamic antenna adaptation in accordance with aspects of the present disclosure. The device 1605 may be an example of aspects of a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to codebook consideration for dynamic antenna adaptation). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, or information channels related to codebook consideration for dynamic antenna adaptation). In some examples, the transmitter 1615 may be co-located with a receiver 1610 in a transceiver module. The transmitter 1615 may utilize a single antenna or a set of multiple antennas.

The communications manager 1620, the receiver 1610, the transmitter 1615, or various combinations thereof or various components thereof may be examples of means for performing various aspects of codebook consideration for dynamic antenna adaptation as described herein. For example, the communications manager 1620, the receiver 1610, the transmitter 1615, or various combinations or components thereof may support a method for performing one or more of the functions described herein.

In some examples, the communications manager 1620, the receiver 1610, the transmitter 1615, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1620, the receiver 1610, the transmitter 1615, or various combinations or components thereof may be implemented in code (e.g., as communications management software or firmware) executed by a processor. If implemented in code executed by a processor, the functions of the communications manager 1620, the receiver 1610, the transmitter 1615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1620 may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at the device 1605 (e.g., a base station) in accordance with examples as disclosed herein. For example, the communications manager 1620 may be configured as or otherwise support a means for transmitting, to a UE, first control signaling indicating a first codebook configuration associated with a first CSI-RS antenna port configuration. The communications manager 1620 may be configured as or otherwise support a means for transmitting, to the UE, second control signaling indicating a second codebook configuration associated with a second CSI-RS antenna port configuration, where the second CSI-RS antenna port configuration includes fewer antenna ports than the first CSI-RS antenna port configuration. The communications manager 1620 may be configured as or otherwise support a means for receiving, from the UE, a CSI report based on the first codebook configuration and the second codebook configuration.

By including or configuring the communications manager 1620 in accordance with examples as described herein, the device 1605 (e.g., a processor controlling or otherwise coupled to the receiver 1610, the transmitter 1615, the communications manager 1620, or a combination thereof) may support techniques for reduced power consumption.

Figure 17:
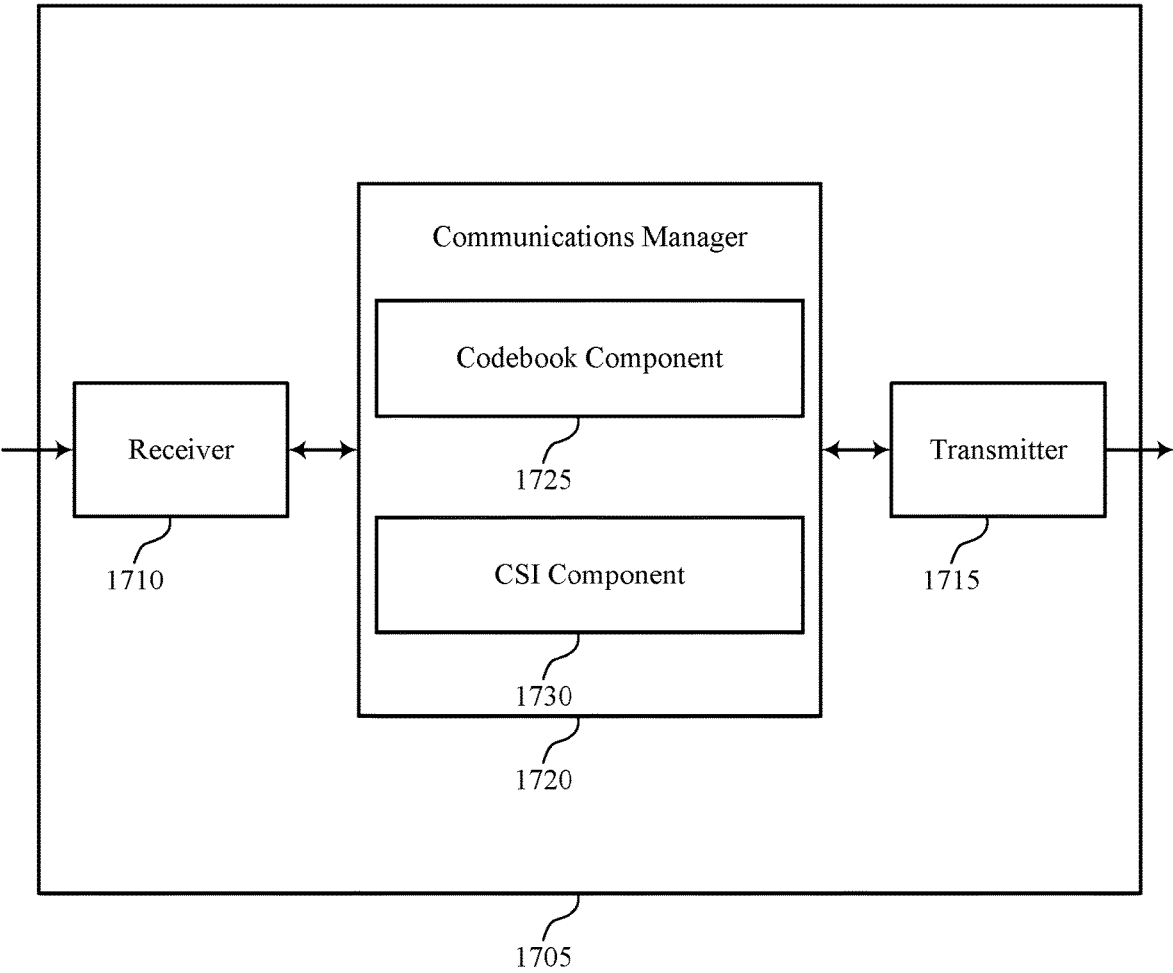

FIG. 17 shows a block diagram 1700 of a device 1705 that supports codebook consideration for dynamic antenna adaptation in accordance with aspects of the present disclosure. The device 1705 may be an example of aspects of a device 1605 or a base station 105 as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, or information channels related to codebook consideration for dynamic antenna adaptation). Information may be passed on to other components of the device 1705. The receiver 1710 may utilize a single antenna or a set of multiple antennas.

The transmitter 1715 may provide a means for transmitting signals generated by other components of the device 1705. For example, the transmitter 1715 may transmit information such as packets, user data, control information, or any combination thereof associated with various information channels (e.g., control channels, data channels, or information channels related to codebook consideration for dynamic antenna adaptation). In some examples, the transmitter 1715 may be co-located with a receiver 1710 in a transceiver module. The transmitter 1715 may utilize a single antenna or a set of multiple antennas.

The device 1705, or various components thereof, may be an example of means for performing various aspects of codebook consideration for dynamic antenna adaptation as described herein. For example, the communications manager 1720 may include a codebook component 1725 a CSI component 1730, or any combination thereof. The communications manager 1720 may be an example of aspects of a communications manager 1620 as described herein. In some examples, the communications manager 1720, or various components thereof, may be configured to perform various operations (e.g., receiving, monitoring, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to receive information, transmit information, or perform various other operations as described herein.

The communications manager 1720 may support wireless communication at the device 1705 (e.g., a base station) in accordance with examples as disclosed herein. The codebook component 1725 may be configured as or otherwise support a means for transmitting, to a UE, first control signaling indicating a first codebook configuration associated with a first CSI-RS antenna port configuration. The codebook component 1725 may be configured as or otherwise support a means for transmitting, to the UE, second control signaling indicating a second codebook configuration associated with a second CSI-RS antenna port configuration, where the second CSI-RS antenna port configuration includes fewer antenna ports than the first CSI-RS antenna port configuration. The CSI component 1730 may be configured as or otherwise support a means for receiving, from the UE, a CSI report based on the first codebook configuration and the second codebook configuration.

FIG. 18 shows a block diagram 1800 of a communications manager 1820 that supports codebook consideration for dynamic antenna adaptation in accordance with aspects of the present disclosure. The communications manager 1820 may be an example of aspects of a communications manager 1620, a communications manager 1720, or both, as described herein. The communications manager 1820, or various components thereof, may be an example of means for performing various aspects of codebook consideration for dynamic antenna adaptation as described herein. For example, the communications manager 1820 may include a codebook component 1825, a CSI component 1830, an antenna port component 1835, or any combination thereof. Each of these components may communicate, directly or indirectly, with one another (e.g., via one or more buses).

The communications manager 1820 may support wireless communication at a base station in accordance with examples as disclosed herein. The codebook component 1825 may be configured as or otherwise support a means for transmitting, to a UE, first control signaling indicating a first codebook configuration associated with a first CSI-RS antenna port configuration. In some examples, the codebook component 1825 may be configured as or otherwise support a means for transmitting, to the UE, second control signaling indicating a second codebook configuration associated with a second CSI-RS antenna port configuration, where the second CSI-RS antenna port configuration includes fewer antenna ports than the first CSI-RS antenna port configuration. The CSI component 1830 may be configured as or otherwise support a means for receiving, from the UE, a CSI report based on the first codebook configuration and the second codebook configuration.

In some examples, one or both of the first codebook configuration or the second codebook configuration includes a set of codebooks. In some examples, the codebook component 1825 may be configured as or otherwise support a means for transmitting third control signaling indicating at least one codebook of the set of codebooks being associated with one or both of the first codebook configuration or the second codebook configuration. In some examples, the CSI component 1830 may be configured as or otherwise support a means for receiving the CSI report further based on the third control signaling.

In some examples, to support transmitting the third control signaling, the codebook component 1825 may be configured as or otherwise support a means for transmitting one or more of a RRC message, DCI, or a MAC-CE, indicating the at least one codebook of the set of codebooks being associated with one or both of the first codebook configuration or the second codebook configuration. In some examples, to support transmitting the first control signaling, the CSI component 1830 may be configured as or otherwise support a means for transmitting a CSI reporting configuration, the CSI reporting configuration indicating the first codebook configuration associated with the first CSI-RS antenna port configuration.

In some examples, to support transmitting the first control signaling, the codebook component 1825 may be configured as or otherwise support a means for transmitting one or more of a RRC message, DCI, or a MAC-CE, indicating the first codebook configuration associated with the first CSI-RS antenna port configuration. In some examples, to support transmitting the second control signaling, the codebook component 1825 may be configured as or otherwise support a means for transmitting one or more of a RRC message, DCI, or a MAC-CE, indicating the second codebook configuration associated with the second CSI-RS antenna port configuration.

In some examples, the codebook component 1825 may be configured as or otherwise support a means for transmitting jointly the first control signaling indicating the first codebook configuration associated with the first CSI-RS antenna port configuration and the second control signaling indicating the second codebook configuration associated with the second CSI-RS antenna port configuration. In some examples, to support transmitting the second control signaling, the antenna port component 1835 may be configured as or otherwise support a means for transmitting a CSI-RS antenna port configuration index associated with the second CSI-RS antenna port configuration.

In some examples, to support transmitting the second control signaling, the codebook component 1825 may be configured as or otherwise support a means for transmitting jointly a first indication of the second codebook configuration associated with the second CSI-RS antenna port configuration and a second indication of a set of CSI-RS resources for the CSI measurement. In some examples, one or both of a DFT beam restriction or a rank indicator restriction correspond to the second codebook configuration associated with the second CSI-RS antenna port configuration.

In some examples, the second CSI-RS antenna port configuration includes a preconfigured CSI-RS antenna port configuration and is entirely included within the first CSI-RS antenna port configuration. In some examples, one or both of the first codebook configuration or the second codebook configuration corresponds to one or more antenna panels.

Figure 19:
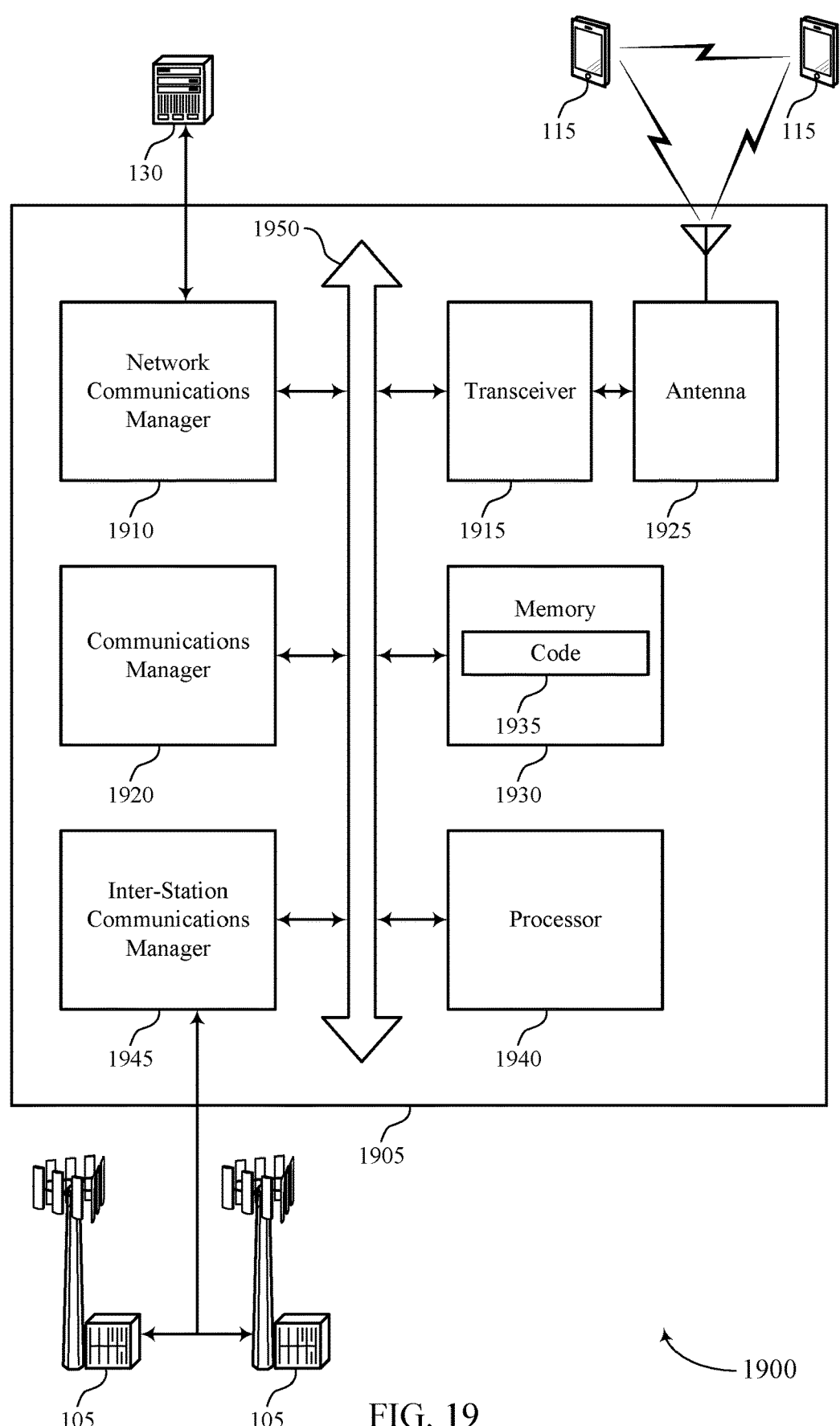
FIG. 19 shows a diagram of a system including a device that supports codebook consideration for dynamic antenna adaptation in accordance with aspects of the present disclosure.

FIG. 19 shows a diagram of a system 1900 including a device 1905 that supports codebook consideration for dynamic antenna adaptation in accordance with aspects of the present disclosure. The device 1905 may be an example of or include the components of a device 1605, a device 1705, or a base station 105 as described herein. The device 1905 may communicate wirelessly with one or more base stations 105, UEs 115, or any combination thereof. The device 1905 may include components for bi-directional voice and data communications including components for transmitting and receiving communications, such as a communications manager 1920, a network communications manager 1910, a transceiver 1915, an antenna 1925, a memory 1930, code 1935, a processor 1940, and an inter-station communications manager 1945. These components may be in electronic communication or otherwise coupled (e.g., operatively, communicatively, functionally, electronically, electrically) via one or more buses (e.g., a bus 1950).

The network communications manager 1910 may manage communications with a core network 130 (e.g., via one or more wired backhaul links). For example, the network communications manager 1910 may manage the transfer of data communications for client devices, such as one or more UEs 115.

In some cases, the device 1905 may include a single antenna 1925. However, in some other cases the device 1905 may have more than one antenna 1925, which may be capable of concurrently transmitting or receiving multiple wireless transmissions. The transceiver 1915 may communicate bi-directionally, via the one or more antennas 1925, wired, or wireless links as described herein. For example, the transceiver 1915 may represent a wireless transceiver and may communicate bi-directionally with another wireless transceiver. The transceiver 1915 may also include a modem to modulate the packets, to provide the modulated packets to one or more antennas 1925 for transmission, and to demodulate packets received from the one or more antennas 1925. The transceiver 1915, or the transceiver 1915 and one or more antennas 1925, may be an example of a transmitter 1615, a transmitter 1715, a receiver 1610, a receiver 1710, or any combination thereof or component thereof, as described herein.

The memory 1930 may include RAM and ROM. The memory 1930 may store computer-readable, computer-executable code 1935 including instructions that, when executed by the processor 1940, cause the device 1905 to perform various functions described herein. The code 1935 may be stored in a non-transitory computer-readable medium such as system memory or another type of memory. In some cases, the code 1935 may not be directly executable by the processor 1940 but may cause a computer (e.g., when compiled and executed) to perform functions described herein. In some cases, the memory 1930 may contain, among other things, a BIOS which may control basic hardware or software operation such as the interaction with peripheral components or devices.

The processor 1940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting codebook consideration for dynamic antenna adaptation). For example, the device 1905 or a component of the device 1905 may include a processor 1940 and memory 1930 coupled to the processor 1940, the processor 1940 and memory 1930 configured to perform various functions described herein.

The inter-station communications manager 1945 may manage communications with other base stations 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communications network technology to provide communication between base stations 105.

The communications manager 1920 may support wireless communication at the device 1905 (e.g., a base station) in accordance with examples as disclosed herein. For example, the communications manager 1920 may be configured as or otherwise support a means for transmitting, to a UE, first control signaling indicating a first codebook configuration associated with a first CSI-RS antenna port configuration. The communications manager 1920 may be configured as or otherwise support a means for transmitting, to the UE, second control signaling indicating a second codebook configuration associated with a second CSI-RS antenna port configuration, where the second CSI-RS antenna port configuration includes fewer antenna ports than the first CSI-RS antenna port configuration. The communications manager 1920 may be configured as or otherwise support a means for receiving, from the UE, a CSI report based on the first codebook configuration and the second codebook configuration.

By including or configuring the communications manager 1920 in accordance with examples as described herein, the device 1905 may support techniques for improved communication reliability, reduced latency, and reduced power consumption.

In some examples, the communications manager 1920 may be configured to perform various operations (e.g., receiving, monitoring, transmitting) using or otherwise in cooperation with the transceiver 1915, the one or more antennas 1925, or any combination thereof. Although the communications manager 1920 is illustrated as a separate component, in some examples, one or more functions described with reference to the communications manager 1920 may be supported by or performed by the processor 1940, the memory 1930, the code 1935, or any combination thereof. For example, the code 1935 may include instructions executable by the processor 1940 to cause the device 1905 to perform various aspects of codebook consideration for dynamic antenna adaptation as described herein, or the processor 1940 and the memory 1930 may be otherwise configured to perform or support such operations.

Figure 20:
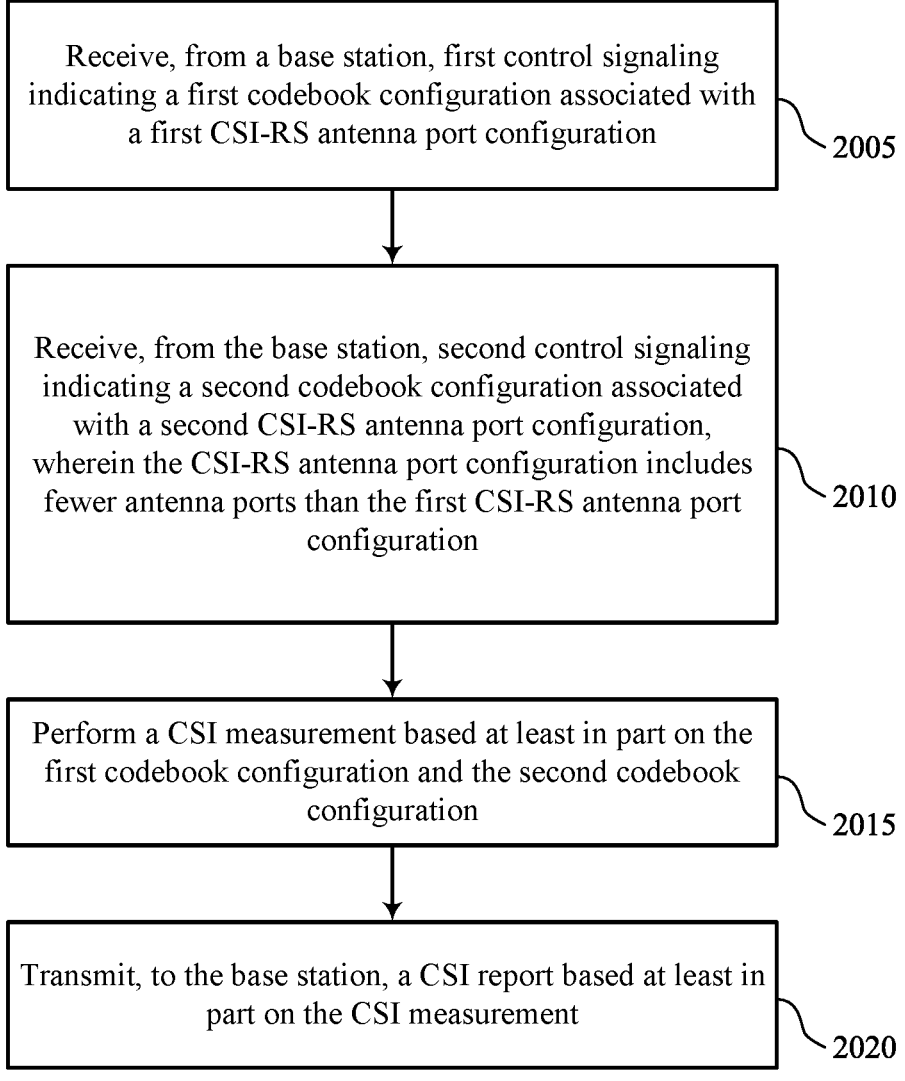

FIG. 20 shows a flowchart illustrating a method 2000 that supports codebook consideration for dynamic antenna adaptation in accordance with aspects of the present disclosure. The operations of the method 2000 may be implemented by a UE or its components as described herein. For example, the operations of the method 2000 may be performed by a UE as described with reference to FIGS. 1 through 15. In some examples, a UE may execute a set of instructions to control the functional elements of the UE to perform the described functions. Additionally or alternatively, a UE may perform aspects of the described functions using special-purpose hardware.

At 2005, the method may include receiving, from a base station, first control signaling indicating a first codebook configuration associated with a first CSI-RS antenna port configuration. The operations of 2005 may be performed in accordance with examples as disclosed herein. In some examples, aspects of the operations of 2005 may be performed by a codebook component 1425 as described with reference to FIG. 14.

At 2010, the method may include receiving, from the base station, second control signaling indicating a second codebook configuration associated with a second CSI-RS antenna port configuration, where the second CSI-RS antenna port configuration includes fewer antenna ports than the first CSI-RS antenna port configuration. The operations of 2010 may be performed in accordance with examples as disclosed herein. In some examples, aspects of the operations of 2010 may be performed by a codebook component 1425 as described with reference to FIG. 14.

At 2015, the method may include performing a CSI measurement based on the first codebook configuration and the second codebook configuration. The operations of 2015 may be performed in accordance with examples as disclosed herein. In some examples, aspects of the operations of 2015 may be performed by a CSI component 1430 as described with reference to FIG. 14.

At 2020, the method may include transmitting, to the base station, a CSI report based on the CSI measurement. The operations of 2020 may be performed in accordance with examples as disclosed herein. In some examples, aspects of the operations of 2020 may be performed by a CSI component 1430 as described with reference to FIG. 14.

FIG. 21 shows a flowchart illustrating a method 2100 that supports codebook consideration for dynamic antenna adaptation in accordance with aspects of the present disclosure. The operations of the method 2100 may be implemented by a UE or its components as described herein. For example, the operations of the method 2100 may be performed by a UE as described with reference to FIGS. 1 through 15. In some examples, a UE may execute a set of instructions to control the functional elements of the UE to perform the described functions. Additionally or alternatively, a UE may perform aspects of the described functions using special-purpose hardware.

At 2105, the method may include receiving, from a base station, first control signaling indicating a first codebook configuration associated with a first CSI-RS antenna port configuration. The operations of 2105 may be performed in accordance with examples as disclosed herein. In some examples, aspects of the operations of 2105 may be performed by a codebook component 1425 as described with reference to FIG. 14.

At 2110, the method may include receiving, from the base station, second control signaling indicating a second codebook configuration associated with a second CSI-RS antenna port configuration, where the second CSI-RS antenna port configuration includes fewer antenna ports than the first CSI-RS antenna port configuration. The operations of 2110 may be performed in accordance with examples as disclosed herein. In some examples, aspects of the operations of 2110 may be performed by a codebook component 1425 as described with reference to FIG. 14.

At 2115, the method may include determining that one or both of the first codebook configuration or the second codebook configuration includes a set of codebooks. The operations of 2115 may be performed in accordance with examples as disclosed herein. In some examples, aspects of the operations of 2115 may be performed by a codebook component 1425 as described with reference to FIG. 14.

At 2120, the method may include performing a CSI measurement based on at least one codebook of the set of codebooks being associated with one or both of the first codebook configuration or the second codebook configuration. The operations of 2120 may be performed in accordance with examples as disclosed herein. In some examples, aspects of the operations of 2120 may be performed by a CSI component 1430 as described with reference to FIG. 14.

At 2125, the method may include transmitting, to the base station, a CSI report based on the CSI measurement. The operations of 2125 may be performed in accordance with examples as disclosed herein. In some examples, aspects of the operations of 2125 may be performed by a CSI component 1430 as described with reference to FIG. 14.

Figure 22:
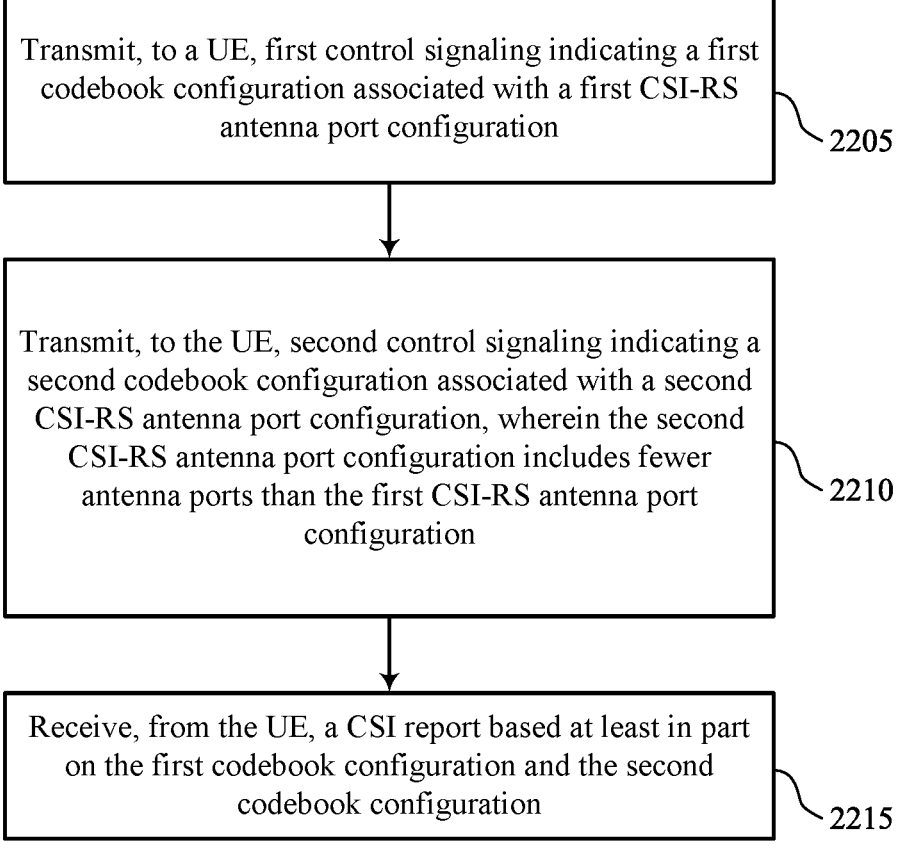

FIG. 22 shows a flowchart illustrating a method 2200 that supports codebook consideration for dynamic antenna adaptation in accordance with aspects of the present disclosure. The operations of the method 2200 may be implemented by a base station or its components as described herein. For example, the operations of the method 2200 may be performed by a base station as described with reference to FIGS. 1 through 11 and 16 through 19. In some examples, a base station may execute a set of instructions to control the functional elements of the base station to perform the described functions. Additionally or alternatively, a base station may perform aspects of the described functions using special-purpose hardware.

At 2205, the method may include transmitting, to a UE, first control signaling indicating a first codebook configuration associated with a first CSI-RS antenna port configuration. The operations of 2205 may be performed in accordance with examples as disclosed herein. In some examples, aspects of the operations of 2205 may be performed by a codebook component 1825 as described with reference to FIG. 18.

At 2210, the method may include transmitting, to the UE, second control signaling indicating a second codebook configuration associated with a second CSI-RS antenna port configuration, where the second CSI-RS antenna port configuration includes fewer antenna ports than the first CSI-RS antenna port configuration. The operations of 2210 may be performed in accordance with examples as disclosed herein. In some examples, aspects of the operations of 2210 may be performed by a codebook component 1825 as described with reference to FIG. 18.

At 2215, the method may include receiving, from the UE, a CSI report based on the first codebook configuration and the second codebook configuration. The operations of 2215 may be performed in accordance with examples as disclosed herein. In some examples, aspects of the operations of 2215 may be performed by a CSI component 1830 as described with reference to FIG. 18.

The following provides an overview of aspects of the present disclosure:

Aspect 1: A method for wireless communication at a UE, comprising: receiving, from a base station, first control signaling indicating a first codebook configuration associated with a first CSI-RS antenna port configuration: receiving, from the base station, second control signaling indicating a second codebook configuration associated with a second CSI-RS antenna port configuration, wherein the second CSI-RS antenna port configuration includes fewer antenna ports than the first CSI-RS antenna port configuration: performing a CSI measurement based at least in part on the first codebook configuration and the second codebook configuration: and transmitting, to the base station, a CSI report based at least in part on the CSI measurement.

Aspect 2: The method of aspect 1, further comprising: determining that one or both of the first codebook configuration or the second codebook configuration comprises a set of codebooks, wherein performing the CSI measurement is further based at least in part on at least one codebook of the set of codebooks being associated with one or both of the first codebook configuration or the second codebook configuration.

Aspect 3: The method of aspect 2, further comprising: receiving third control signaling indicating the at least one codebook of the set of codebooks being associated with one or both of the first codebook configuration or the second codebook configuration, wherein performing the CSI measurement is further based at least in part on the third control signaling indicating the at least one codebook of the set of codebooks.

Aspect 4: The method of aspect 3, wherein receiving the third control signaling comprises: receiving one or more of an RRC message, DCI, or a MAC-CE, indicating the at least one codebook of the set of codebooks being associated with one or both of the first codebook configuration or the second codebook configuration.

Aspect 5: The method of any of aspects 1 through 4, wherein receiving the first control signaling comprises: receiving a CSI reporting configuration, the CSI reporting configuration indicating the first codebook configuration associated with the first CSI-RS antenna port configuration.

Aspect 6: The method of any of aspects 1 through 5, wherein receiving the first control signaling comprises: receiving one or more of an RRC message, DCI, or a MAC-CE, indicating the first codebook configuration associated with the first CSI-RS antenna port configuration.

Aspect 7: The method of any of aspects 1 through 6, wherein receiving the second control signaling comprises: receiving one or more of an RRC message, DCI, or a MAC-CE, indicating the second codebook configuration associated with the second CSI-RS antenna port configuration.

Aspect 8: The method of any of aspects 1 through 7, further comprising: receiving jointly the first control signaling indicating the first codebook configuration associated with the first CSI-RS antenna port configuration and the second control signaling indicating the second codebook configuration associated with the second CSI-RS antenna port configuration.

Aspect 9: The method of any of aspects 1 through 8, wherein receiving the second control signaling comprises: receiving a CSI-RS antenna port configuration index associated with the second CSI-RS antenna port configuration, wherein performing the CSI measurement is further based at least in part on the CSI-RS antenna port configuration index.

Aspect 10: The method of any of aspects 1 through 9, further comprising: determining one or both of a DFT beam restriction or a rank indicator restriction based at least in part on the second codebook configuration associated with the second CSI-RS antenna port configuration, wherein performing the CSI measurement is further based at least in part on one or both of the DFT beam restriction or the rank indicator restriction.

Aspect 11: The method of any of aspects 1 through 10, wherein receiving the second control signaling comprises: receiving jointly a first indication of the second codebook configuration associated with the second CSI-RS antenna port configuration and a second indication of a set of CSI-RS resources for the CSI measurement, wherein performing the CSI measurement is further based at least in part on the second codebook configuration and the set of CSI-RS resources.

Aspect 12: The method of any of aspects 1 through 11, wherein performing the CSI measurement comprises: performing the CSI measurement on a decreased number of antenna elements of a set of antenna elements and based at least in part on the second codebook configuration, the decreased number of antenna elements corresponding to the.

Aspect 13: The method of any of aspects 1 through 12, wherein performing the CSI measurement comprises: performing the CSI measurement on a decreased number of antenna panels of a set of antenna panels and based at least in part on the second codebook configuration.

Aspect 14: The method of any of aspects 1 through 13, wherein the second CSI-RS antenna port configuration comprises a preconfigured CSI-RS antenna port configuration and is entirely included within the first CSI-RS antenna port configuration.

Aspect 15: The method of any of aspects 1 through 14, wherein one or both of the first codebook configuration or the second codebook configuration corresponds to one or more antenna panels.

Aspect 16: A method for wireless communication at a base station, comprising: transmitting, to a UE, first control signaling indicating a first codebook configuration associated with a first CSI-RS antenna port configuration: transmitting, to the UE, second control signaling indicating a second codebook configuration associated with a second CSI-RS antenna port configuration, wherein the second CSI-RS antenna port configuration includes fewer antenna ports than the first CSI-RS antenna port configuration: and receiving, from the UE, a CSI report based at least in part on the first codebook configuration and the second codebook configuration.

Aspect 17: The method of aspect 16, wherein one or both of the first codebook configuration or the second codebook configuration comprises a set of codebooks.

Aspect 18: The method of aspect 17, further comprising: transmitting third control signaling indicating at least one codebook of the set of codebooks being associated with one or both of the first codebook configuration or the second codebook configuration, wherein receiving the CSI report is further based at least in part on the third control signaling.

Aspect 19: The method of aspect 18, wherein transmitting the third control signaling comprises: transmitting one or more of an RRC message, DCI, or a MAC-CE, indicating the at least one codebook of the set of codebooks being associated with one or both of the first codebook configuration or the second codebook configuration.

Aspect 20: The method of any of aspects 16 through 19, wherein transmitting the first control signaling comprises: transmitting a CSI reporting configuration, the CSI reporting configuration indicating the first codebook configuration associated with the first CSI-RS antenna port configuration.

Aspect 21: The method of any of aspects 16 through 20, wherein transmitting the first control signaling comprises: transmitting one or more of an RRC message, DCI, or a MAC-CE, indicating the first codebook configuration associated with the first CSI-RS antenna port configuration.

Aspect 22: The method of any of aspects 16 through 21, wherein transmitting the second control signaling comprises: transmitting one or more of an RRC message, DCI, or a MAC-CE, indicating the second codebook configuration associated with the second CSI-RS antenna port configuration.

Aspect 23: The method of any of aspects 16 through 22, further comprising: transmitting jointly the first control signaling indicating the first codebook configuration associated with the first CSI-RS antenna port configuration and the second control signaling indicating the second codebook configuration associated with the second CSI-RS antenna port configuration.

Aspect 24: The method of any of aspects 16 through 23, wherein transmitting the second control signaling comprises: transmitting a CSI-RS antenna port configuration index associated with the second CSI-RS antenna port configuration.

Aspect 25: The method of any of aspects 16 through 24, wherein transmitting the second control signaling comprises: transmitting jointly a first indication of the second codebook configuration associated with the second CSI-RS antenna port configuration and a second indication of a set of CSI-RS resources for the CSI measurement.

Aspect 26: The method of any of aspects 16 through 25, wherein one or both of a DFT beam restriction or a rank indicator restriction correspond to the second codebook configuration associated with the second CSI-RS antenna port configuration.

Aspect 27: The method of any of aspects 16 through 26, wherein the second CSI-RS antenna port configuration comprises a preconfigured CSI-RS antenna port configuration and is entirely included within the first CSI-RS antenna port configuration.

Aspect 28: The method of any of aspects 16 through 27, wherein one or both of the first codebook configuration or the second codebook configuration corresponds to one or more antenna panels.

Aspect 29: An apparatus for wireless communication at a UE, comprising a processor: memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a base station, comprising a processor; memory coupled with the processor; and instructions stored in the memory and executable by the processor to cause the apparatus to perform a method of any of aspects 16 through 28.

Aspect 33: An apparatus for wireless communication at a base station, comprising at least one means for performing a method of any of aspects 16 through 28.

Aspect 34: A non-transitory computer-readable medium storing code for wireless communication at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a base station, first control signaling indicating a first codebook configuration associated with a first channel state information reference signal antenna port configuration, wherein the first codebook configuration comprises at least a first set of codebooks;

receiving, from the base station, second control signaling indicating a second codebook configuration associated with a second channel state information reference signal antenna port configuration, wherein the second channel state information reference signal antenna port configuration includes fewer antenna ports than the first channel state information reference signal antenna port configuration, and wherein the second codebook configuration comprises at least a second set of codebooks;

receiving, from the base station, third control signaling indicating at least one codebook of the first set of codebooks or the second set of codebooks;

performing a channel state information measurement based at least in part on the first codebook configuration or the second codebook configuration according to the third control signaling; and transmitting, to the base station, a channel state information report based at least in part on the channel state information measurement.

2. The method of claim 1, wherein receiving the third control signaling comprises:

receiving one or more of a radio resource control message, downlink control information, or a medium access control-control element, indicating the at least one codebook of the first set of codebooks or the second set of codebooks.

3. The method of claim 1, wherein receiving the first control signaling comprises:

receiving a channel state information reporting configuration, the channel state information reporting configuration indicating the first codebook configuration associated with the first channel state information reference signal antenna port configuration.

4. The method of claim 1, wherein receiving the first control signaling comprises:

receiving one or more of a radio resource control message, downlink control information, or a medium access control-control element, indicating the first codebook configuration associated with the first channel state information reference signal antenna port configuration.

5. The method of claim 1, wherein receiving the second control signaling comprises:

receiving one or more of a radio resource control message, downlink control information, or a medium access control-control element, indicating the second codebook configuration associated with the second channel state information reference signal antenna port configuration.

6. The method of claim 1, further comprising:

receiving jointly the first control signaling indicating the first codebook configuration associated with the first channel state information reference signal antenna port configuration and the second control signaling indicating the second codebook configuration associated with the second channel state information reference signal antenna port configuration.

7. The method of claim 1, wherein receiving the second control signaling comprises:

receiving a channel state information reference signal antenna port configuration index associated with the second channel state information reference signal antenna port configuration, wherein performing the channel state information measurement is further based at least in part on the channel state information reference signal antenna port configuration index.

8. The method of claim 1, further comprising:

determining one or both of a discrete Fourier transform beam restriction or a rank indicator restriction based at least in part on the second codebook configuration associated with the second channel state information reference signal antenna port configuration, wherein performing the channel state information measurement is further based at least in part on one or both of the discrete Fourier transform beam restriction or the rank indicator restriction.

9. The method of claim 1, wherein receiving the second control signaling comprises:

receiving jointly a first indication of the second codebook configuration associated with the second channel state information reference signal antenna port configuration and a second indication of a set of channel state information reference signal resources for the channel state information measurement, wherein performing the channel state information measurement is further based at least in part on the second codebook configuration and the set of channel state information reference signal resources.

10. The method of claim 1, wherein performing the channel state information measurement comprises:

performing the channel state information measurement on a decreased number of antenna elements of a set of antenna elements and based at least in part on the second codebook configuration.

11. The method of claim 1, wherein performing the channel state information measurement comprises:

performing the channel state information measurement on a decreased number of antenna panels of a set of antenna panels and based at least in part on the second codebook configuration.

12. The method of claim 1, wherein the second channel state information reference signal antenna port configuration comprises a preconfigured channel state information reference signal antenna port configuration and is entirely included within the first channel state information reference signal antenna port configuration.

13. The method of claim 1, wherein one or both of the first codebook configuration or the second codebook configuration corresponds to one or more antenna panels.

14. A method for wireless communication at a base station, comprising:

transmitting, to a user equipment (UE), first control signaling indicating a first codebook configuration associated with a first channel state information reference signal antenna port configuration, wherein the first codebook configuration comprises a first set of codebooks;

transmitting, to the UE, second control signaling indicating a second codebook configuration associated with a second channel state information reference signal antenna port configuration, wherein the second channel state information reference signal antenna port configuration includes fewer antenna ports than the first channel state information reference signal antenna port configuration, and wherein the second codebook configuration comprises a second set of codebooks;

transmitting, to the UE, third control signaling indicating at least one codebook of the first set of codebooks or the second set of codebooks; and receiving, from the UE, a channel state information report based at least in part on the first codebook configuration or the second codebook configuration according to the third control signaling.

15. The method of claim 14, wherein transmitting the third control signaling comprises:

transmitting one or more of a radio resource control message, downlink control information, or a medium access control-control element, indicating the at least one codebook of the first set of codebooks or the second set of codebooks.

16. The method of claim 14, wherein transmitting the first control signaling comprises:

transmitting a channel state information reporting configuration, the channel state information reporting configuration indicating the first codebook configuration associated with the first channel state information reference signal antenna port configuration.

17. The method of claim 14, wherein transmitting the first control signaling comprises:

transmitting one or more of a radio resource control message, downlink control information, or a medium access control-control element, indicating the first codebook configuration associated with the first channel state information reference signal antenna port configuration.

18. The method of claim 14, wherein transmitting the second control signaling comprises:

transmitting one or more of a radio resource control message, downlink control information, or a medium access control-control element, indicating the second codebook configuration associated with the second channel state information reference signal antenna port configuration.

19. The method of claim 14, further comprising:

transmitting jointly the first control signaling indicating the first codebook configuration associated with the first channel state information reference signal antenna port configuration and the second control signaling indicating the second codebook configuration associated with the second channel state information reference signal antenna port configuration.

20. The method of claim 14, wherein transmitting the second control signaling comprises:

transmitting a channel state information reference signal antenna port configuration index associated with the second channel state information reference signal antenna port configuration.

21. The method of claim 14, wherein transmitting the second control signaling comprises:

transmitting jointly a first indication of the second codebook configuration associated with the second channel state information reference signal antenna port configuration and a second indication of a set of channel state information reference signal resources for a channel state information measurement.

22. The method of claim 14, wherein one or both of a discrete Fourier transform beam restriction or a rank indicator restriction correspond to the second codebook configuration associated with the second channel state information reference signal antenna port configuration.

23. The method of claim 14, wherein the second channel state information reference signal antenna port configuration comprises a preconfigured channel state information reference signal antenna port configuration and is entirely included within the first channel state information reference signal antenna port configuration.

24. The method of claim 14, wherein one or both of the first codebook configuration or the second codebook configuration corresponds to one or more antenna panels.

25. An apparatus for wireless communication, comprising:

one or more processors;

one or more memories coupled with the one or more processors; and instructions stored in the one or more memories and executable by the one or more processors to cause the apparatus to:

receive, from a base station, first control signaling indicating a first codebook configuration associated with a first channel state information reference signal antenna port configuration, wherein the first codebook configuration comprises a first set of codebooks;

receive, from the base station, second control signaling indicating a second codebook configuration associated with a second channel state information reference signal antenna port configuration, wherein the second channel state information reference signal antenna port configuration includes fewer antenna ports than the first channel state information reference signal antenna port configuration, and wherein the second codebook configuration comprises a second set of codebooks;

receive, from the base station, third control signaling indicating at least one codebook of the first set of codebooks or the second set of codebooks;

perform a channel state information measurement based at least in part on the first codebook configuration or the second codebook configuration according to the third control signaling; and transmit, to the base station, a channel state information report based at least in part on the channel state information measurement.

26. An apparatus for wireless communication, comprising:

one or more processors;

one or more memories coupled with the one or more processors; and instructions stored in the one or more memories and executable by the one or more processors to cause the apparatus to:

transmit, to a user equipment (UE), first control signaling indicating a first codebook configuration associated with a first channel state information reference signal antenna port configuration, wherein the first codebook configuration comprises a first set of codebooks;

transmit, to the UE, second control signaling indicating a second codebook configuration associated with a second channel state information reference signal antenna port configuration, wherein the second channel state information reference signal antenna port configuration includes fewer antenna ports than the first channel state information reference signal antenna port configuration, and wherein the second codebook configuration comprises a second set of codebooks;

transmit, to the UE, third control signaling indicating at least one codebook of the first set of codebooks or the second set of codebooks; and receive, from the UE, a channel state information report based at least in part on the first codebook configuration or the second codebook configuration according to the third control signaling.

* * * * *